United States Patent
Hochstetter et al.

(10) Patent No.: US 10,000,662 B2
(45) Date of Patent: *Jun. 19, 2018

(54) THERMOPLASTIC COMPOSITE MATERIAL REINFORCED WITH SYNTHETIC FIBERS AND MANUFACTURING PROCESS

(71) Applicant: ARKEMA FRANCE, Colombes (FR)

(72) Inventors: Gilles Hochstetter, Bernay (FR); Thierry Briffaud, Caorches Saint Nicolas (FR); Michel Glotin, Saint-cloud (FR); Pierre Nogues, Bernay (FR); Maliha Khusrawy, Bernay (FR)

(73) Assignee: ARKEMA FRANCE, Colombes (FR)

( * ) Notice: Subject to any disclaimer, the term of this patent is extended or adjusted under 35 U.S.C. 154(b) by 384 days.

This patent is subject to a terminal disclaimer.

(21) Appl. No.: 14/353,849

(22) PCT Filed: Oct. 23, 2012

(86) PCT No.: PCT/FR2012/052421
§ 371 (c)(1),
(2) Date: Apr. 24, 2014

(87) PCT Pub. No.: WO2013/060976
PCT Pub. Date: May 2, 2013

(65) Prior Publication Data
US 2014/0316063 A1    Oct. 23, 2014

(30) Foreign Application Priority Data
Oct. 25, 2011 (FR) ..................... 11 59658

(51) Int. Cl.
| | | |
|---|---|---|
| *C08L 77/00* | (2006.01) | |
| *D21H 17/55* | (2006.01) | |
| *C09D 177/06* | (2006.01) | |
| *B29C 70/52* | (2006.01) | |
| *C08G 69/48* | (2006.01) | |
| *B29C 67/24* | (2006.01) | |
| *C08J 5/24* | (2006.01) | |
| *B29C 70/24* | (2006.01) | |
| *B29K 77/00* | (2006.01) | |

(52) U.S. Cl.
CPC .......... *C09D 177/06* (2013.01); *B29C 67/246* (2013.01); *B29C 70/24* (2013.01); *B29C 70/52* (2013.01); *C08G 69/48* (2013.01); *C08J 5/24* (2013.01); *B29K 2077/00* (2013.01); *C08J 2367/00* (2013.01); *C08J 2377/00* (2013.01); *C08J 2377/12* (2013.01)

(58) Field of Classification Search
None
See application file for complete search history.

(56) References Cited

U.S. PATENT DOCUMENTS

| | | |
|---|---|---|
| 4,673,723 A | 6/1987 | Cuzin |
| 4,820,367 A | 4/1989 | Cuzin |
| 4,927,583 A | 5/1990 | Lottiau et al. |
| 5,019,427 A | 5/1991 | Soules |
| 5,047,263 A | 9/1991 | Glemet |
| 5,138,021 A | 8/1992 | Judas et al. |
| 5,187,018 A | 2/1993 | Glemet |
| 5,496,920 A | 3/1996 | Pfaendner et al. |
| 5,605,945 A | 2/1997 | Sayed et al. |
| 5,665,855 A | 9/1997 | Acevedo et al. |
| 5,807,966 A | 9/1998 | Pfaendner et al. |
| 2008/0020219 A1 | 1/2008 | Bouquerel et al. |
| 2010/0215920 A1* | 8/2010 | Orange ............... B29C 45/0001 428/195.1 |
| 2011/0241249 A1 | 10/2011 | Orange et al. |

(Continued)

FOREIGN PATENT DOCUMENTS

| | | |
|---|---|---|
| CA | 2101215   * | 1/1994 |
| EP | 0174225 A1 | 3/1986 |
| EP | 0201367 A1 | 11/1986 |

(Continued)

OTHER PUBLICATIONS

International Search Report (PCT/ISA/210) dated Dec. 21, 2012, by the European Patent Office as the International Searching Authority for International Application No. PCT/FR2012/052421.
European Search Report issued by the European Patent Office dated Feb. 4, 2016 in corresponding European Application No. 12189569.2 (2 pages).
Office Action issued by the European Patent Office dated Aug. 29, 2016 in corresponding European Application No. 12189569.2 (5 pages).

(Continued)

*Primary Examiner* — Robert T Butcher
(74) *Attorney, Agent, or Firm* — Buchanan Ingersoll & Rooney P.C.

(57) ABSTRACT

A method for producing a composite material, including an assembly of one or a plurality of synthetic reinforcement fibers, impregnated with at least one thermoplastic polymer having a vitreous transition temperature Tg greater than or equal to 80° C. including: i) a step of impregnating said assembly with a precursor composition in the molten state and including: a) at least one prepolymer P(X)n of said thermoplastic polymer, including a molecular chain P having, at the ends n thereof, identical reactive functions X, said prepolymer having a semiaromatic and/or semi-cycloaliphatic structure, b) at least one chain extender including two identical functions Y, which are reactive with at least one of said functions X; ii) a step of polymerization by mass (poly)addition, in the molten state, of said prepolymer with said chain extender, with said thermoplastic polymer of the thermoplastic matrix being the result of said polymerization by mass polyaddition.

35 Claims, No Drawings

(56) References Cited

U.S. PATENT DOCUMENTS

2012/0077398 A1    3/2012  Gaillard et al.

FOREIGN PATENT DOCUMENTS

| | | |
|---|---|---|
| EP | 0384063 A2 | 8/1990 |
| EP | 0394900 A2 | 10/1990 |
| EP | 0425341 A1 | 5/1991 |
| EP | 0581641 A1 | 2/1994 |
| EP | 0581642 A1 | 2/1994 |
| EP | 0628588 A1 | 12/1994 |
| EP | 0685528 A1 | 12/1995 |
| EP | 0739924 A1 | 10/1996 |
| EP | 0857745 A2 | 8/1998 |
| EP | 1419875 A1 | 5/2004 |
| EP | 2386397 A1 | 5/2010 |
| FR | 2562467 A1 | 10/1985 |
| FR | 2603891 A1 | 3/1988 |
| FR | 2936441 A1 | 4/2010 |
| JP | 02229021 A | 9/1990 |
| WO | WO 95/35343 A1 | 12/1995 |
| WO | WO 2005/061209 A1 | 7/2005 |
| WO | WO 2010/130930 A1 | 11/2010 |

OTHER PUBLICATIONS

First Office Action issued by the Japanese Patent Office dated May 12, 2015 in corresponding Japanese Application No. 2014-537691 (8 pages).

\* cited by examiner

THERMOPLASTIC COMPOSITE MATERIAL REINFORCED WITH SYNTHETIC FIBERS AND MANUFACTURING PROCESS

The present invention relates to the field of thermoplastic composite materials. More particularly, it relates to a process for the manufacture of a composite material comprising reinforcement of synthetic fibers which are impregnated with a thermoplastic polymer, an intermediate product, which is a fibrous prepreg, a precursor composition used for the implementation of such a process, composite parts which result therefrom and applications as structural parts.

Composite materials and more particularly composite materials comprising reinforcing fibers impregnated with a polymer matrix are used in many technical fields, in particular in aeronautical, aerospace, wind power, motor vehicle, railway and maritime applications. These applications require mainly composites having high mechanical performances, in particular at high operating temperatures.

The composites with a matrix based on thermosetting polymers occupy a dominating position in these markets by virtue of their manufacturing processes and their ease of use. These materials are increasingly used to lighten structures, for example in the aeronautical industry and in the motor vehicle industry. However, thermosetting polymers cannot satisfy increasingly significant requirements which hang over the manufacturers, which are limiting constraints for these materials, in particular for the motor vehicle industry as regards: the reduction of the cycle times, the reduction in the energy consumption and the recycling ability of the materials used. Mention may be made, as other disadvantages of these materials, of the toxicity of some of their components and the emission of volatile organic compounds (monomers, such as styrene) during their handling and processing, requiring protection and/or specific handling and processing conditions. An additional disadvantage of the thermosetting materials is the postcuring volume shrinkage, which affects the dimensional stability and the surface appearance after molding and requires a specific treatment.

Consequently, thermoplastic polymers, which exhibit the advantage of being easily recyclable and which are, in the case of polyamides, lighter than thermosetting polymers, offer novel perspectives in the field of composites as polymer matrix. However, the current processes for the manufacture of composites comprising a thermoplastic matrix are more restricting than those employing thermosetting polymers and the quality of the composite manufactured is not always optimum. The essential limiting factor for the processing of a thermoplastic composite is the viscosity of the thermoplastic polymer which will be used as matrix, impregnating the fibrous substrate. This is because, even in the molten state, this viscosity remains high and thus makes the impregnation of the fibrous substrate more difficult than a liquid resin, such as, for example, a thermosetting resin based on unsaturated polyester or on vinyl ester.

The polymer matrix must first have good impregnation of reinforcing fibers in order to allow the mechanical stresses experienced by the composite material to be transmitted to the reinforcing fibers, thus with a more effective response of said composite material to the mechanical stress. Subsequently, the coating of said reinforcing fibers by this matrix provides these fibers with chemical protection. In particular, in order for a composite comprising a thermoplastic matrix to have good mechanical properties in the final use, in particular in terms of impact strength, it is necessary for the molecular weight of the thermoplastic polymer of the matrix to be as high as possible. On the other hand, this characteristic of high molecular weight is reflected, during the manufacture of the composite, by a high melt viscosity of the matrix. This viscosity poses serious difficulties in achieving a suitable impregnation of the fibers: thus, the composite obtained can exhibit defects of impregnation with microcavities created which are capable of bringing about mechanical deficiencies, in particular a delamination of the fibers, and of weakening the final composite material.

Various solutions are known for overcoming the problem of impregnation of the fibers. Manufacturers have, for example, attempted to carry out the impregnation of the fibers under higher pressure and/or to lengthen the impregnation time. These solutions are not satisfactory as, under the effect of the pressure, the fibers can be locally disoriented, resulting in a loss of properties of the composite, and increasing the impregnation time in order to compensate for the high viscosity of the thermoplastic resin proves to be too long to be compatible with mass production of parts. Furthermore, equipment operating at high pressure is incompatible with the production of large-size parts due to the costs of such equipment.

Another route for facilitating the impregnation of the fibers consists in acting on the fibers/matrix interface. Patent EP 0 201 367 thus provides a thermoplastic polymer composite material reinforced with fibers in which the bonding between the polymer and the fibers is provided by a second thermoplastic polymer of low viscosity which promotes the wetting of the fibers. This solution is not easy to implement as it requires not only the presence of a second polymer but, in addition, it is necessary for the second polymer to have a good ability to wet the fibers and for it also to have good compatibility with the main polymer. In addition, this polymer can constitute a weak point due to its low molecular weight and/or its low thermal resistance (low Tg, low melting point).

Moreover, FR 2 936 441 describes the use, as thermoplastic matrix, of a polyamide "resin" of low molecular weight, with Mw ranging from 5000 to 25 000 and nonchanging, to impregnate a reinforcing cloth for a composite article. The polyamide resin has as specific feature a content of end amine or carboxyl groups not exceeding 20 meq/kg, essentially corresponding to polyamides having only end amine or carboxyl functional groups. This furthermore explains the nonincrease (lack of change) in the molecular weights of these polyamides which is their essential characteristic. The resin is presented as fluid in the molten state for impregnating the reinforcing cloth but with the absence of possibility of elongation of the chain.

FR 2 603 891 describes a process for the manufacture of a composite material consisting of a polyamide matrix reinforced with long reinforcing fibers. These fibers are impregnated with a prepolymer or with a polyamide oligomer which comprises end reactive functional groups capable of reacting with one another under the effect of heating, resulting in the elongation of the polymer chain. The oligomer or the prepolymer has a low molecular weight. The reactive functional groups described in this document react by condensation with consequently the formation of volatile condensation by-products (water).

WO 2005/061209 describes a precursor article for a composite material comprising a thermoplastic polymeric matrix and reinforcing fibers, in which the polymeric matrix is itself in the form of yarns and/or fibers, such as to be able to form a composite material by melting said precursor article, in particular by thermocompression. This solution requires a preliminary comixing operation, which is often expensive, and this does not deal with the problem of the compromise to be made between the viscosity of the thermoplastic resin and its molecular weight.

There is thus a need first for an improved process for the manufacture of a composite material comprising a specific thermoplastic polymer matrix, which process, as a result of the choice of this matrix, has the same advantages as a process for the manufacture of a composite material comprising a thermosetting polymer matrix in terms of initial low viscosity for the impregnation of the fibers, while allowing a short production cycle, that is to say of less than 30 min and more particularly of less than 3 min, and thus a high productive output suitable for the manufacture of composite parts, of complex geometry and on a large scale, and which process in addition presents the technical advantages related to the use of thermoplastic polymers of high molecular weight, particularly advantaged by their structure in terms of lightness (in particular in the case of polyamides) and of recyclability. The last two environmental constraints are being increasingly applied in a context of energy saving and sustainable development.

More particularly, the challenge faced by the present invention is that of finding a technical solution which is a compromise to be found between good impregnation of the reinforcing fibers with a specific thermoplastic matrix, which has a low viscosity at the start and a fairly high molecular weight and Tg (at least 80° C.) at the end, so as to provide an elevated mechanical performance, in particular under hot conditions, while allowing processing with a short production cycle and at low or moderate pressure (less than 30 bar and more particularly less than 10 bar). In addition to the constraint of mass production and the difficult compromise between the low initial viscosity and the final molecular weight which is as high as possible, the specific chemistry to be used to prepare such a thermoplastic matrix, in addition to its rapid polymerization kinetics, has to be compatible with a process for the manufacture of the final composite, in particular in a closed mold, such as RTM (resin transfer molding) or S-RIM (structural RIM or structural reaction injection molding) or injection/compression molding or infusion molding, with in particular the absence of any by-product eliminated during the polymerization. Thus, the chemistry to be used has to satisfy the requirements set out above. More particularly, the process of the present invention makes possible very good impregnation of the reinforcing fibers by using a specific reactive precursor composition, of low viscosity, while making it possible, by its specific polymerization reaction, to significantly increase the molecular weight of the final thermoplastic polymer in a short time and to thus result in the high mechanical performance targeted with mechanical strength at high temperature (creep strength) and in particular with a mechanical performance, in terms of modulus and breaking stress, which does not change much up to a temperature of at least 90° C. and preferably of at least 100° C. This good compromise between good impregnation of the fibers and the high mechanical performance which is stable at high temperature is made possible by the use of a reactive precursor composition for the thermoplastic matrix comprising prepolymers having identical reactive functional groups, preferably of limited molecular weight, and chain extenders carrying the functional groups which coreact with the functional groups of said prepolymers by bulk (poly)addition, these extenders being in particular specifically selected in order to avoid the formation and the elimination of gaseous or volatile by-products under the processing conditions and to thus avoid the formation of microbubbles in the final material, as happens in a reaction for polymerization by (poly)condensation, which is by definition excluded from the present invention.

For the implementation of such a process, there is thus needed a precursor composition (mixture), intended to form the thermoplastic matrix of a composite material, which matrix is reinforced with synthetic reinforcing fibers and which matrix has a high Tg (of at least 80° C.), said composition making it possible, in the molten state, to suitably impregnate the fibers and at the same time to be capable, after polymerization by a specific reaction and without formation and elimination of by-products, of providing excellent cohesion of the composite material and optimum transmission of the strains towards the reinforcing fibers, for use at high temperature, in particular with a mechanical performance which does not change much (in terms of modulus and breaking stress) up to a temperature of at least 90° C., preferably of at least 100° C.

In addition, there exists a need to have available a composite material comprising a thermoplastic matrix exhibiting good properties of use, in particular from the viewpoint of the mechanical strength at high temperature (creep strength), for example in order to manufacture structural mechanical parts.

There thus exists a need for a process for the manufacture of a composite material comprising a thermoplastic matrix, without formation and elimination of volatile or gaseous by-products under the conditions of processing of the composite material, which makes possible the manufacture of a composite part having a better dimensional stability and thermal resistance (mechanical strength under hot conditions), with respect to the known processes for the manufacture of composites comprising a thermoplastic matrix. The material thus manufactured exhibits a good mechanical performance even when it is stressed at high temperature, this being the case despite the use of a low pressure for the impregnation of the fibers and despite the short manufacturing cycle time.

The invention is based in particular on the use of a thermoplastic prepolymer which is weakly viscous in the molten state, preferably of low molecular weight, which makes it possible to suitably impregnate the fibers, and for all that very reactive, with the result that, by bulk polymerizing by polyaddition and in the presence of a specific chain extender (melt blend), it achieves a number-average molecular weight high enough to confer, on the matrix, its advantageous mechanical properties. The process for the manufacture of the composite material according to the invention is also advantageous in that it does not cause a secondary reaction nor reaction by-products formed to be eliminated, during the polymerization of the matrix. This is because these eliminated products can become gaseous and volatile under the processing conditions and can weaken the final composite material via the microbubbles created. In particular, the specific reaction used does not generate condensation water. It is thus not necessary to provide a system for the discharge of by-products in the devices employed for the manufacture and/or the processing or shaping of the composite material of the present invention, which makes it possible to also reduce the size of the plants and the energy costs.

The invention also makes it possible to employ shaping technologies which were hitherto reserved for thermosetting polymers, at the very least in the field of composites. In accordance with the invention, it is thus possible to manufacture a composite part comprising a thermoplastic matrix by structural reaction injection molding (SRIM) or by injection/compression molding or by infusion or by RTM.

The first subject matter of the invention is thus a process for the manufacture of a composite material based on the impregnation of the fibrous substrate or assemblage for one or more synthetic reinforcing fibers by using a specific reactive precursor composition, which is the precursor of the thermoplastic matrix, which composition comprises a) at least one reactive prepolymer for said thermoplastic polymer and b) at least one chain extender which is specifically chosen, more particularly as a function of the reactive groups of said prepolymer.

A precursor composition for the thermoplastic matrix, used for the implementation of said process for the manufacture of said prepreg, also comes within the invention.

Another subject matter of the invention is the use of said precursor composition for the impregnation of an assemblage of one or more synthetic reinforcing fibers for the manufacture of a preimpregnated fibrous material or for the manufacture of a composite material which can be a molded composite part.

A preimpregnated fibrous material, as semifinished product, resulting from the impregnation in the molten state of a fibrous assemblage according to the invention by at least one precursor composition according to the invention is also covered by the invention.

The final subject matter of the invention is a finished product which is a composite material which can be a molded composite part, which composite material is obtained by the process of the invention and more particularly by the use of said precursor composition.

The first subject matter of the invention thus relates to a process for the manufacture of a composite material, comprising an assemblage of one or more synthetic reinforcing fibers which are preferably long, said assemblage being impregnated with at least one thermoplastic polymer having a glass transition temperature Tg of greater than or equal to 80° C. and preferably from 100 to 200° C., more preferably from 110 to 200° C., in particular from 110° C. to less than 180° C. and more preferably still from 120 to 170° C. (Tg measured by DSC), said process comprising:

i) a stage of impregnation of said assemblage with a precursor composition in the molten state (that is to say, after melting), the impregnation in particular being carried out at a temperature such that the viscosity of said precursor composition in the molten state does not exceed 100 Pa·s, preferably does not exceed 50 Pa·s, said precursor composition comprising:
   a) a prepolymer $P(X)_n$ of said thermoplastic polymer, comprising a molecular chain P having, at its ends, n identical reactive functional groups X, said prepolymer being of semiaromatic and/or semicycloaliphatic structure, with X being a reactive functional group from: OH, $NH_2$ or COOH, in particular with said prepolymer having a number-average molecular weight Mn ranging from 500 to 10 000, preferably from 1000 to 10 000, more preferably from 1000 to 6000 and better still from 2000 to 6000 g·mol$^{-1}$, with n ranging from 1 to 3, preferably n being 1 or 2, more preferably 2 (n=2),
   b) a chain extender, which can be represented by Y-A-Y, comprising two identical Y functional groups which react with at least one of said X functional groups, ii) a stage of bulk polymerization by (poly)addition in the molten state of said prepolymer with said chain extender, with said thermoplastic polymer of said thermoplastic matrix being the result or the product of said bulk polymerization by polyaddition.

As regards the structure of the P chain of said prepolymer, it is oligomeric and of semi-cycloaliphatic and/or semiaromatic structure. Semicycloaliphatic structure or structure based on cycloaliphatic structure means that the structure comprises a cycloaliphatic structure. A semiaromatic structure is defined analogously.

More particularly, said chain extender is a hydrocarbon molecular chain of nonpolymeric structure, that is to say without repeat units and thus which is neither polymer nor oligomer, and preferably having a molecular weight of less than 500 and more preferably of less than 400. In said extender, which can be represented by Y-A-Y, A is a carbon-based spacer or radical carrying the two Y groups (or functional groups), with A being of nonpolymeric structure, that is to say neither polymer nor oligomer.

The viscosity mentioned in the molten state of stage i) means that it is that of the precursor composition in the molten state at the impregnation.

The impregnation can be carried out at a temperature which ranges from 150 to 340° C., preferably from 200 to 320° C. and more particularly from 200 to 300° C. and can be the same as that of polymerization. The impregnation conditions, in particular of temperature and time, are controlled in order to have an impregnation viscosity of said precursor composition not exceeding 100 Pa·s and preferably not exceeding 50 Pa·s. In particular, the impregnation temperature is controlled, like the impregnation time, in order to prevent the polyaddition reaction from significantly progressing and prevent a consequent viscosity in the molten state of the reactive composition which would be greater than the upper limit fixed above (100 Pa·s and preferably 50 Pa·s). The essential parameter for control of the impregnation remains the impregnation temperature, given that the impregnation time depends on the shape and size of the part, as in the number of injection points in a mold.

It should be noted that said synthetic reinforcing fibers, in particular organic polymer fibers, in order to act as reinforcement, have by definition to have a melting point temperature Tm' or glass transition temperature Tg', for lack of Tm', which is greater than the glass transition temperature Tg of said thermoplastic polymer of the matrix and in any case greater than the polymerization temperature and greater than the processing temperature, if the latter is greater than the polymerization temperature. The polymerization temperature (and processing temperature) can range from 150 to 340° C., preferably from 200 to 320° C. and more preferably from 200 to 300° C. More particularly, for organic fibers and more particularly still for polymer fibers, this Tm' or Tg' can be greater than 350° C. in the case where the polymerization temperature is at the maximum value of the $1^{st}$ range (340° C.). The Tm' is measured by DSC, according to the standard ISO 11357, in $2^{nd}$ heat where the temperature rises 20° C./min. The Tg and Tg' are also measured by DSC.

More particularly, the impregnation stage i), like the polymerization stage ii) of this process, is carried out with a specific precursor composition for said thermoplastic matrix which is a mixture in the molten state a) of at least one prepolymer and b) of at least one chain extender as are defined above according to the invention.

Preferably, the process according to the invention also comprises a stage iii) of final processing of said composite material.

Said prepolymer $P(X)_n$, as defined above, is a prepolymer for said thermoplastic polymer constituting the thermoplastic matrix having a Tg of at least 80° C. for the composite material of the invention and, as such, this prepolymer comprises, in its molecular chain P, repeat units corresponding to said thermoplastic polymer. By definition, the molecular weight of said prepolymer is lower than that of the final thermoplastic polymer (having Tg of at least 80° C.). Furthermore, said final thermoplastic polymer comprises one or more structural units of said chain extender in the reacted state, after reaction between the Y functional groups of said extender and the X functional groups of said prepolymer. For example, in the case where said polymer is a polyamide, this means that its main structure is a polyamide (amide repeat units) resulting from the chain elongation of the polyamide prepolymer $P(X)_n$ via one or more chain extenders Y-A-Y, which has Y groups or functional groups which react with the X groups or functional groups of said prepolymer.

By definition of the formula $P(X)_n$, the n X groups are identical. Likewise, in said chain extender which can be represented by Y-A-Y, the two Y groups are identical. Thus, by definition, the X groups cannot react with one another and, likewise, the Y groups cannot react with one another. By definition also of the thermoplastic polymer of the thermoplastic matrix, this polymer is devoid of any crosslinked structure.

In the process according to the present invention, said prepolymer has in particular a number-average molecular weight Mn ranging from 500 to 10 000 g·mol$^{-1}$, preferably from 1000 to 10000 g·mol$^{-1}$, more preferably from 1000 to 6000 g·mol$^{-1}$ and better still from 2000 to 6000 g·mol$^{-1}$, measured by titrating the end X functional groups. It might also be possible to speak of corresponding intrinsic viscosity, measured in m-cresol, ranging from 0.1 to 1.0, preferably from 0.2 to 1.0, more preferably from 0.2 to 0.7 and better still from 0.3 to 0.7 dl/g. More particularly, the Mn for the prepolymer $P(X)_n$ is calculated from the titrating (by potentiometry) of the end X functional groups (concentration in meq/g of X) and from the calculated theoretical functionality n of said prepolymer (n calc), in view of the material balance and functionality of reactors present, with Mn and n calc being defined in the following way:

$$Mn = n\ calc*1000/[X]$$

with $n\ calc = 2[X]/([X]+[M]-[B])$ and finally $Mn = 2000/([X]+[M]-[B])$ where [X], [M] and [B] are respectively the molar concentrations of reactive functional groups X (measured), of ends of nonreactive chains M (obtained, for example, by calculation starting from the amount of monofunctional reactant, if introduced in the charging) and of trifunctional branching points B (obtained, for example, by calculation starting from the amount of trifunctional reactant, if introduced in the charging), Mn being expressed in g/mol and the concentrations in meq/g.

More particularly, said prepolymer has a molecular weight at least approximately half that of the final polymer and, in this case (Mn approximately twice the molecular weight of the prepolymer), said final thermoplastic polymer comprises two prepolymer P chains per one molecule of said chain extender, prepolymer chains and extender molecule being bonded to one another via two bonds formed between an X functional group and a Y functional group. In this case, the molecular weight of said prepolymer is chosen from the upper part of the abovementioned range, so that the molecular weight of the final thermoplastic polymer is sufficiently high, as required by the present invention. More particularly, the targeted number-average molecular weight of said final thermoplastic polymer preferably corresponds to intrinsic viscosity values, measured in m-cresol, of greater than 1 dl/g, preferably from 1 to 3 dl/g and more preferably from 1.2 to 2 dl/g. These last viscosity ranges can be regarded as equivalent to molecular weights Mn ranging from 10 000 to 40 000, preferably from 12 000 to 30 000, which can be measured by assaying the end functional groups and the functionality.

According to a more particular and preferred form of this process, said prepolymer carries two (identical) reactive functional groups X, with n=2 in $P(X)_n$, and said Y functional groups of the extender react with the two X functional groups of said prepolymer, this corresponding to a chain elongation by polyaddition, which means an addition repeated several times. In order to achieve the high molecular weights for the final thermoplastic polymer according to the invention, it is necessary to adjust the Y/X molar ratio as a function of the targeted weight Mn or intrinsic viscosity. This ratio can vary between 0.5 and 1.5, it being known that, the closer this ratio is to 1, the higher is the weight Mn or the intrinsic viscosity.

The impregnate stage i) is generally carried out at a temperature greater than the melting point or, for lack of melting, at a temperature greater than the glass transition temperature of said prepolymer $P(X)_n$ and optionally of its mixture with said chain extender, which may be represented by Y-A-Y. More particularly, this impregnation temperature of stage i) is adjusted so that the viscosity in the molten state (in bulk) of said precursor composition does not exceed, during the impregnation, 100 Pa·s and preferably does not exceed 50 Pa·s. This stage i) can be carried out under a pressure ranging from 1 to 30 bar, preferably from 1 to 10 bar.

As regards the polymerization stage ii), it can be carried out at a temperature ranging from 150 to 340° C., preferably from 200 to 320° C. and more preferably from 200 to 300° C.

The processing temperature of stage iii) can lie within the range of the polymerization temperature, as indicated above, being able to be identical to the polymerization temperature.

According to a preferred form of the process according to the invention as described above, the thermoplastic polymer is chosen from: a polyamide, a polyester, their copolymers, for example polyamide-polyether copolymer, or their mixtures and, preferably, this thermoplastic polymer is a polyamide. This preferred definition of the thermoplastic polymer implicitly results in the preferred choice of said reactive prepolymer $P(X)_n$ from the reactive prepolymers: polyamide and copolymers, including polyamide-polyether, polyesters and copolymers, or their mixtures between polyamides and polyesters and their copolymers.

Regarding the preferred reactive functional groups X carried by said prepolymer, they are chosen from: hydroxyl (OH), amine (NH$_2$) or carboxyl (COOH), more preferably amine or carboxyl. The amine symbolized by NH$_2$ covers both a primary amine and a secondary amine. In the case where the primary amine can react in the prepolymer/extender system (for example if bismaleimide) with its two N—H entities, the proportions and mode of addition of the two reactants are controlled so as to prevent any crosslinking, the objective of the invention being to obtain a thermoplastic matrix which can be recycled by heating the polymer above its melting point (if semicrystalline) or above its glass transition temperature, if it is amorphous.

Generally, when the functionality of one of the two reactants is greater than 2, in order to avoid any potential crosslinking, the mean functionality per reactant (prepolymer+chain extender mixed up), which means the total number of reactive functional groups X+Y, divided by the total number of moles of prepolymer+chain extender, must not exceed 2. More particularly, the Macosko-Miller relationship, well known to a person skilled in the art, which connects the proportions of reactants, their functionality and the degree of conversion, can be used in this context.

Thus, by definition, any presence of crosslinked polymer in the final thermoplastic polymer matrix of the composite according to the invention is excluded.

The thermoplastic polymer has a glass transition temperature Tg of at least 80° C., preferably ranging from 100 to 200° C., more preferably from 110 to 200° C. and more preferably still from 110 to less than 180° C. and more particularly from 120 to 170° C. The Tg (like Tg') is measured by DSC after $2^{nd}$ passage at a heating rate of 20° C./min. It is advantageous to achieve a high glass transition temperature as defined above in order for the composite parts manufactured according to the invention to be capable of resisting mechanically when they are stressed, in particular at a high temperature. More particularly, they have to withstand a temperature ranging up to 90° C. and preferably up to 100° C., without excessively affecting the mechanical strength (in particular the modulus and the breaking stress), with maintenance of a high mechanical strength (modulus and breaking stress), as has to be the case for the mechanical parts used in the motor vehicle or aeronautical industry, and preferably without a fall in these performances greater than 30%, in particular of at most 25%, with respect to the performances at ambient temperature (23° C.).

In order to achieve such glass transition temperatures, use is preferably made of a thermoplastic polymer based on aromatic and/or cycloaliphatic structures, that is to say comprising aromatic and/or cycloaliphatic structures and more particularly comprising (having) at least 25 mol % of its units comprising aromatic and/or cycloaliphatic structures. Reference will be made, in this case, according to this definition of the present invention, to thermoplastic polymer "based on aromatic and/or cycloaliphatic structure" (that is to say, comprising an aromatic and/or cycloaliphatic structure) or to polymer "based on aromatic structure" or to polymer "based on cycloaliphatic structure", as the case may be. Use will sometimes be made of the "equivalent" term of "semiaromatic" or "semicycloaliphatic" polymer with the same meaning for the present invention. This definition is also valid for the prepolymer $P(X)_n$ of the present invention, which is by definition a prepolymer of said thermoplastic polymer of the thermoplastic matrix of the composite according to the invention.

More particularly, said prepolymer $P(X)_n$ corresponds to n, X and P as follows:
  n=from 1 to 3, preferably 1 or 2, more preferably n=2,
  X is a reactive functional group chosen from: OH, $NH_2$ or COOH, preferably amine ($NH_2$) or carboxyl (COOH),
  said chain P, the hydrocarbon molecular chain, comprising a cycloaliphatic and/or aromatic structure (or also being able to be defined, as explained above, as of semicycloaliphatic and/or semiaromatic structure) comprising in particular at least one ring of 4, 5 or 6 carbon atoms which is optionally substituted. This means that the molecular chain P of said prepolymer has or comprises a repeat unit of cycloaliphatic and/or aromatic structure and in particular comprises at least one ring of 4, 5 or 6 carbon atoms which is optionally substituted.

The thermoplastic polymer (of the thermoplastic matrix) is chosen from: a polyamide, a polyester, their copolymers, for example polyamide-polyether copolymer, with their mixtures and, preferably, the thermoplastic polymer is a polyamide.

The prepolymer $P(X)_n$ can be chosen from a polyamide prepolymer, a copolyamide prepolymer, a polyester prepolymer, a copolyester prepolymer, a polyamide-polyether copolymer prepolymer, a polyamide-polyester copolymer prepolymer with their mixtures (prepolymer mixtures).

More particularly, the thermoplastic polymer of the thermoplastic matrix, like the corresponding prepolymer $P(X)_n$ used according to the invention, is of semiaromatic and/or semicycloaliphatic structure.

In the process of the present invention, as described above, a preferred prepolymer is a polyamide prepolymer $P(X)_n$, preferably based on (or comprising an) aromatic and/or cycloaliphatic structure (or also to be denoted semiaromatic and/or semicycloaliphatic), obtained from:
  the polycondensation of at least one linear or branched aliphatic diamine and of at least one aromatic and/or cycloaliphatic dicarboxylic acid comprising at least one ring having 4, 5 or 6 carbon atoms which is optionally substituted, and/or
  the polycondensation of at least one cycloaliphatic diamine with at least one linear or branched aliphatic, cycloaliphatic or aromatic dicarboxylic acid,
  and optionally with the presence of at least one compound chosen from: a lactam, an aminocarboxylic acid or the stoichiometric combination of an aliphatic dicarboxylic acid and an aliphatic diamine.

More particularly, mention may be made, as suitable example of polyamide (or copolyamide) prepolymer corresponding to the formula $P(X)_n$ defined above, of the cases described below:
  a polyamide (or copolyamide) prepolymer comprising reactive functional groups X=$NH_2$, based on aromatic and/or cycloaliphatic structure, which fulfills the characteristics of Tg according to the present invention and which can be obtained, for example, from:
    aromatic diacids, such as iso- and terephthalic acids, 2,6-, 1,5- or 2,7-naphthalenedicarboxylic acids, 4,4'-dicarboxydiphenyl ether, 4,4'-dicarboxybiphenyl, or furandicarboxylic acid,
    aliphatic diacids, for example linear or branched $C_4$ to $C_{24}$ aliphatic diacids, such as adipic, sebacic or 1,12-dodecanedioic acid, provided that cycloaliphatic diamine or aromatic or cycloaliphatic diacid is present,
    cycloaliphatic diacids, such as cyclohexane-1,4-dicarboxylic, cyclohexane-1,3-dicarboxylic or cyclobutane-1,3-dicarboxylic acid,
    cycloaliphatic diamines, for example bis(3-methyl-4-aminocyclohexyl)methane, bis(4-aminocyclohexyl)methane, isophoronediamine, bis(3,5-dialkyl-4-aminocyclohexyl)methanes, bis(3,5-dialkyl-4-aminocyclohexyl)ethanes, bis(3,5-dialkyl-4-aminocyclohexyl)propane, 2,2-bis(3-methyl-4-aminocyclohexyl)propane (BMACP), isopropylidenedi(cyclohexylamine) (PACP) or 2,6-bis(aminomethyl)norbornane (BAMN),
    aliphatic diamines, for example linear or branched $C_2$ to $C_{24}$ aliphatic diamines, such as 1,6-hexamethylenediamine, 1,19-nonamethylenediamine, 1,10-decamethylenediamine, 1,12-dodecamethylenediamine, provided that aromatic and optionally cycloaliphatic dicarboxylic acids (or anhydrides) or cycloaliphatic diamines are present, lactams, for example $C_5$ to $C_{14}$ lactams, such as caprolactam or dodecalactam, provided that other aromatic and optionally cycloaliphatic coreactants are present, amino acids, for example $C_5$ to $C_{14}$ amino acids, such as 11-aminoundecanoic acid, provided that other aromatic and optionally cycloaliphatic coreactants are present, in a [COOH]/[$NH_2$] ratio such as necessary to have an excess of amine, it being possible for this excess to be adjusted as a function of the Mn targeted for said prepolymer.

A polyamide (or copolyamide) prepolymer comprising reactive functional groups X=COOH of the same structure as the above (based on aromatic and/or cycloaliphatic structure), which fulfills the characteristics of Tg according to the present invention, can be obtained from the same components as mentioned above for the prepolymer with X=$NH_2$, with as difference the use here of an excess of COOH with respect to $NH_2$.

Mention may be made, as more detailed example of carboxylated polyamide prepolymer suitable for the invention, of the dicarboxylated oligoamide cited under reference V in the application EP 0 581 642 of the applicant company, with an Mn of 3000, obtained from terephthalic acid (T), isophthalic acid (I), lactam-12 (L12) and bis(3-methyl-4-aminocyclohexyl)methane (BMACM) in molar proportions: T/I/L12/BMACM: 3.6/2.4/5/5.

Such carboxylated prepolymers are suitable for the polymerization according to the invention with chain extenders as described in the same patent application, under cited references A for bisoxazolines and references B, C and D for bisoxazines, or described in the application EP 0 739 924 of the applicant company, under references A to F for bisimidazolines.

In order to obtain a polyamide prepolymer comprising functional groups X=$NH_2$, it is sufficient to have an excess of amine functional groups with respect to the carboxylic acid functional groups with the same components as those mentioned above. It is possible to take, as more specific example of such a prepolymer, the oligoamide cited under reference IV (based on aromatic or semiaromatic structure) on page 9 of the application EP 0 581 641 of the applicant company with the molar proportions T/I/L12/BMACM: 3/2/2.5/6.

In order to obtain polyamide prepolymers with end functional groups X=hydroxyl (OH), it is possible to modify the end functional groups X=carboxyl of a polyamide prepolymer as mentioned above by reaction of the carboxyl end functional groups with an excess of diol. In order to obtain a prepolymer with a functionality n=1, a monofunctional coreactant (monoamine or monoacid) can be used as coreactant in order to block one end of the chain.

Such aminated or hydroxylated prepolymers are suitable for the polymerization according to the invention with chain extenders as described in the application EP 0 581 641, under references A and B (page 7) for the bisoxazolinones and under references C and D for the bisoxazinones (page 8).

When the prepolymer is a polyester or copolyester prepolymer, the latter is preferably obtained from:

aromatic and/or cycloaliphatic diesters or dicarboxylic acids and/or anhydrides as described above, and cycloaliphatic diols, such as cyclohexanediol, aliphatic diols, such as: ethylene glycol, propylene glycol, 1,4-butanediol, 1,5-pentanediol, 1,6-hexanediol, diethylene glycol or triethylene glycol, aliphatic dicarboxylic acids and/or anhydrides as described above, provided that aromatic and optionally cycloaliphatic diesters and/or dicarboxylic acids and/or anhydrides and cycloaliphatic diols are present.

In order to obtain, for these polyester prepolymers, an end functional group X=carboxyl (COOH), it is possible to use an excess of carboxyl functional groups with respect to OH. In order to obtain an end functional group X=OH, use is made of an excess of the OH functional groups with respect to the carboxyl functional groups. The excess is adjusted as a function of the targeted Mn weight.

In order to obtain a prepolymer $P(X)_n$, with n=3, for example a polyamide with X=amine, it is necessary, for example, to have, in the reaction mixture, a trifunctional amine in addition to the bifunctional diamine and diacid or lactam components.

More particularly, mention may be made, as polyester or copolyester prepolymer corresponding to the formula $P(X)_n$ defined above, of:

a polyester (or copolyester) prepolymer comprising reactive functional groups X=OH, of semiaromatic structure, obtained from aromatic diacid and/or acid anhydride and/or diester and an excess of diol, with the diol being linear or branched $C_2$ to $C_{24}$ aliphatic diol, such as ethylene glycol, propylene glycol, 1,4-butanediol, 1,5-pentanediol, 1,6-hexanediol, diethylene glycol or triethylene glycol, and said aromatic and optionally cycloaliphatic diacid and/or acid anhydride and/or diester being chosen, for example, from terephthalic, isophthalic or tetrahydrophthalic acid/anhydrides and the aromatic diester from dimethyl terephthalate or dimethyl isophthalate, a polyester (or copolyester) prepolymer comprising reactive functional groups X=COOH, of semiaromatic structure, can be obtained, for example, from diacid and/or acid anhydride in excess, such as phthalic anhydride, and those mentioned above, and diol, such as linear or branched $C_2$ to $C_{24}$ aliphatic diol, for example ethylene glycol, propylene glycol, 1,4-butanediol, 1,5-pentanediol, 1,6-hexanediol, diethylene glycol or triethylene glycol.

Mention may be made, as example of prepolymer $P(X)_n$ based on polyamide-polyether copolymer, of a polyamide-polyether sequential copolymer and more particularly polyamide-polyether-polyamide trisequential copolymer carrying functional groups X=COOH, which can be obtained by reaction of a polyamide oligomer with X=COOH, which reacts with a polyether oligomer comprising hydroxyl (OH) endings, said polyamide being in excess and in a ratio of approximately 2 carboxyls per 1 OH (2 polyamide chains per 1 of polyether). An analogous prepolymer $P(X)_n$ but with a polyester instead of the polyamide is possible by replacing the carboxylated polyamide with a carboxylated polyester.

Equivalently, the prepolymer $P(X)_n$ suitable for the invention advantageously exhibits a melt viscosity such that, as a mixture with said extender in said precursor composition, the melt viscosity remains less than 100 Pa·s, preferably less than or equal to 50 Pa·s, at the impregnation temperature for said fibers.

The viscosity of the mixture comprising the prepolymer and the chain extender in the molten state or the melt viscosity of the precursor composition, under the conditions of impregnation of said assemblage of fibers, remains within the range indicated above. The impregnation temperature is generally greater than the melting point and, for lack of melting point, greater than the glass transition temperature of said prepolymer and said chain extender.

Such molecular weight and/or viscosity ranges are chosen in order to obtain optimum impregnation of the synthetic reinforcing fibers.

The specific choice of the chain extenders, with respect to the X functional groups carried by said prepolymer, defines a more particular and preferred process according to the present invention:

when X is $NH_2$ or OH, preferably $NH_2$:
  either the chain extender Y-A-Y corresponds to:
    Y chosen from the groups: maleimide, isocyanate, optionally blocked isocyanate, oxazinone and oxazolinone, preferably oxazinone and oxazolinone, and
    A being a carbon-based spacer or carbon-based radical carrying the reactive groups or functional groups Y, A chosen from:
      a covalent bond between two Y functional groups (groups) in the case where Y=oxazinone or oxazolinone, or
      an aliphatic hydrocarbon chain or an aromatic and/or cycloaliphatic hydrocarbon chain, the latter two comprising at least one ring of 5 or 6 carbon atoms which is optionally substituted, said aliphatic hydrocarbon chain preferably having a molecular weight of 14 to 200,
  or the chain extender Y-A-Y has, as Y group, a caprolactam and it being possible for A to be a carbonyl, such as carbonylbiscaprolactam, or it being possible for A to be a terephthaloyl or an isophthaloyl,
  or said chain extender corresponds to Y being a cyclic anhydride group, which means that said exchanger carries or comprises two cyclic anhydride groups Y and this extender is chosen from an aromatic and/or cycloaliphatic dicarboxylic anhydride and more preferably it is chosen from: ethylenetetracarboxylic dianhydride, pyromellitic dianhydride, 3,3',4,4'-biphenyltetracarboxylic dianhydride, 1,4,5,8-naphthalenetetracarboxylic dianhydride, perylenetetracarboxylic dianhydride, 3,3',4,4'-benzophenonetetracarboxylic dianhydride, 1,2,3,4-cyclobutanetetracarboxylic dianhydride, hexafluoroisopropylidenebisphthalic dianhydride, 9,9-bis(trifluoromethyl)xanthenetetracarboxylic dianhydride, 3,3',4,4'-diphenylsulfonetetracarboxylic dianhydride, bicyclo[2.2.2]oct-7-ene-2,3,5,6-tetracarboxylic dianhydride, 1,2,3,4-cyclopentanetetracarboxylic dianhydride, 3,3',4,4'-diphenylethertetracarboxylic dianhydride or their mixtures,
  and when X is COOH:
  the chain extender Y-A-Y corresponds to:
    Y chosen from the groups: oxazoline, oxazine, imidazoline and aziridine, such as 1,1'-isophthaloyl bis(2-methylaziridine) or the equivalent aziridine with terephthaloyl,
    and to
    A being a carbon-based spacer (radical) as defined above, with it being possible for A, in the case of the oxazolines, oxazines and imidazolines, to be a single covalent bond between the two groups.

More particularly, when Y is chosen from oxazinone, oxazolinone, oxazine, oxazoline or imidazoline, in this case, in the chain extender represented by Y-A-Y, A can represent an alkylene, such as —$(CH_2)_m$— with m ranging from 1 to 14 and preferably from 2 to 10, or A can also represent a cycloalkylene and/or arylene which is substituted (alkyl) or unsubstituted, such as benzenic arylenes, for example o-, m- or p-phenylenes, or naphthalenic arylenes, and A is preferably an arylene and/or a cycloalkylene.

In the case of carbonyl- or terephthaloyl- or isophthaloyl-biscaprolactam as chain extender Y-A-Y, the preferred conditions prevent the elimination of by-product, such as caprolactam, during said polymerization and processing in the molten state.

In the optional abovementioned case where Y represents a blocked isocyanate functional group, this blocking can be obtained with blocking agents for the isocyanate functional group, such as ε-caprolactam, methyl ethyl ketoxime, dimethylpyrazole or diethyl malonate.

Likewise, in the case where the extender is a dianhydride which reacts with a prepolymer $P(X)_n$ where X=$NH_2$, the preferred conditions prevent any formation of imide ring during the polymerization and during the processing of the molten state.

For X=OH or $NH_2$, the Y group is preferably chosen from: isocyanate (nonblocked), oxazinone and oxazolinone, more preferably oxazinone and oxazolinone, with, as spacer (radical), A being as defined above.

Reference may be made, as examples of chain extenders with oxazoline or oxazine reactive functional groups Y suitable for the implementation of the process according to the invention, to those described under references A, B, C and D on page 7 of the application EP 0 581 642 of the applicant company and also to their processes of preparation and their mode of reaction which are set out therein. A is bisoxazoline, B is bisoxazine, C is 1,3-phenylenebisoxazoline and D is 1,4-phenylenebisoxazoline.

Reference may be made, as examples of chain extenders comprising imidazoline reactive functional group Y suitable for the implementation of the process according to the invention, to those described (A to F) on pages 7 to 8 and Table 1 on page 10 in the application EP 0 739 924 of the applicant company and also to their processes of preparation and to their mode of reaction which are set out therein.

Reference may be made, as examples of chain extenders comprising a reactive functional group Y=oxazinone or oxazolinone which are suitable for the implementation of the process according to the invention, to those described under references A to D or on pages 7 to 8 of the application EP 0 581 641 of the applicant company and to their processes of preparation and modes of reaction which are set out therein.

Mention may be made, as examples of suitable oxazinone (ring comprising 6 atoms) and oxazolinone (ring comprising 5 atoms) Y groups, of the Y groups derived from: benzoxazinone, oxazinone or oxazolinone, with, as spacer, it being possible for A to be a single covalent bond with for respective corresponding extenders being: bis(benzoxazinone), bisoxazinone and bisoxazolinone.

A can also be a $C_1$ to $C_{14}$, preferably $C_2$ to $C_{10}$, alkylene but A is preferably an arylene and more particularly it can be a phenylene (1,2- or 1,3- or 1,4-substituted by Y) or a naphthalene radical (disubstituted by Y) or a phthaloyl (iso- or terephthaloyl) or A can be a cycloalkylene.

For the Y functional groups as oxazine (6-membered ring), oxazoline (5-membered ring) and imidazoline (5-membered ring), the A radical can be as described above with it being possible for A to be a single covalent bond and with the respective corresponding extenders being: bisoxazine, bisoxazoline and bisimidazoline. A can also be a $C_1$ to $C_{14}$, preferably $C_2$ to $C_{10}$, alkylene. The A radical is preferably an arylene and more particularly it can be a phenylene (1,2- or 1,3- or 1,4-substituted by Y) or a naphthalene radical (disubstituted by Y) or a phthaloyl (iso- or terephthaloyl) or A can be a cycloalkylene.

In the case where Y=aziridine (nitrogenous heterocycle comprising 3 atoms equivalent to ethylene oxide with the ether —O— being replaced with —NH—), the A radical can be a phthaloyl (1,1'-iso- or terephthaloyl) with, as example of extender, 1,1'-isophthaloyl bis(2-methylaziridine).

The presence of a catalyst of the reaction between the prepolymer $P(X)_n$ and the extender Y-A-Y at a content ranging from 0.001% to 2%, preferably from 0.01% to 0.5%, with respect to the total weight of two mentioned coreactants, can accelerate the (poly)addition reaction and thus shorten the production cycle. Such a catalyst can be chosen from: 4,4'-dimethylaminopyridine, p-toluenesulfonic acid, phosphoric acid, NaOH and optionally those described for a polycondensation or transesterification, as described in EP 0 425 341, page 9, lines 1 to 7.

According to a more specific case of a preceding case in the choice of said extender, A can represent an alkylene, such as $—(CH_2)_m—$ with m ranging from 1 to 14 and preferably from 2 to 10, or represents an alkyl-substituted or unsubstituted arylene, such as benzenic arylenes (such as o-, m- or p-phenylenes) or naphthalenic arylenes (with arylenes: naphthylenes). Preferably, A represents a substituted or unsubstituted arylene which can be benzenic or naphthenic.

According to a more selective choice of the process according to the invention as described above, said thermoplastic polymer is a semiaromatic (based on aromatic structure) and/or semicycloaliphatic (based on cycloaliphatic structure) polyamide, preferably semiaromatic polyamide (based on aromatic structure), homopolyamide (homopolymer) or copolyamide
(polyamide copolymer), more particularly corresponding to one of the following formulae: polyamides from: 8.T, 9.T, 10.T, 11.T, 12.T, 6.T/9.T, 9.T/10.T, 9.T/11.T, 9.T/12.T, 9/6.T, 10/6.T, 11/6.T, 12/6.T, 10/9.T, 10/10.T, 10/11.T, 10/12.T, 11/9.T, 11/10.T, 11/11.T, 11/12.T, 12/9.T, 12/10.T, 12/11.T, 12/12.T, 6.10/6.T, 6.12/6.T, 9.10/6.T, 9.12/6.T, 10.10/6.T, 10.12/6.T, 6.10/9.T, 6.12/9.T, 9.10/9.T, 9.12/9.T, 10.10/9.T 10.12/9.T, 6.10/10.T, 6.12/10.T, 9.10/10.T, 9.12/10.T, 10.10/10.T, 10.12/10.T, 6.10/12.T, 6.12/12.T, 9.10/12.T, 9.12/12.T, 10.10/12.T, 11/6.T/9.T, 11/6.T/10.T, 11/6.T/11.T, 11/6.T/12.T, 11/9.T/10.T, 11/9.T/11.T, 11/9.T/12.T, 11/10.T/11.T, 11/10.T/12.T, 11/11.T/12.T, 6.T/10.T, 6.T/11.T, 6.T/12.T, 10.T/11.T, 10.T/12.T, 11.T/12.T, 12/6.T/10.T, 12/6.T/11.T, 12/6.T/12.T, 12/9.T/10.T, 12/9.T/11.T, 12/9.T/12.T, 12/10.T/11.T, 12/10.T/12.T, 12/11.T/12.T,
preceding terpolymer polyamides with 12/replaced with 9/, 10/, 6.10/, 6.12/, 10.10/, 10.12/, 9.10/and 9.12/,
all the abovementioned polyamides where terephthalic (T) is partially or completely replaced with isophthalic (I), with naphthalene-2,6-dicarboxylic and/or with 1,3- or 1,4-CHDA (cyclohexanedicarboxylic acid), with it being possible for all or a portion of the aliphatic diamines to be replaced with cycloaliphatic diamines,
all the abovementioned polyamides, with replacement of the $C_6$ to $C_{12}$ aliphatic diamine with a cycloaliphatic diamine from BMACM, BACM and/or IPDA and with replacement of all or part of the aromatic diacid T with a linear or branched $C_6$ to $C_{18}$ aliphatic diacid.

The term "corresponding to one of the following formulae" means that the polyamide final thermoplastic polymer which results from the bulk polymerization by (poly)addition between said polyamide prepolymer and said extender of said precursor composition according to the invention defined above has the same main repeat units as said prepolymer, in fact those of the corresponding polyamide mentioned, despite the incorporation, in the chain of the final polymer, of a limited number of units resulting from the extender (extending or bonding units between chains of said prepolymer).

More particularly, the thermoplastic polymer in the process of the invention is a semicrystalline polyamide having a melting point temperature Tm. and a crystallization temperature Tc. These points and temperatures, like the glass transition temperatures, are measured by DSC with Tm and Tc measured according to the standard ISO 11357-3.

Said thermoplastic polymer can be amorphous or semicrystalline. More particularly, said polymer is an amorphous or semicrystalline polyamide. According to a specific form of the invention, it is semicrystalline.

In the preceding list of polyamides based on aromatic and/or cycloaliphatic structure, it is possible to pass from an amorphous polyamide to a semicrystalline polyamide without affecting the Tg by reducing the molar content of units comprising isophthalic or 1,3-CHDA diacids and cycloaliphatic diamines and by increasing the content of terephthalic, 2,6 naphthalenedicarboxylic and 1,4-CHDA diacids.

Mention may be made, as general example of semicrystalline polyamide, of a polyamide based on a structure of terephthalic acid combined with an aliphatic diamine, for example $C_{10}$ or $C_6$ aliphatic diamine. The addition of isophthalic or 1,3-CHDA structure makes it possible to reduce the Tm (crystallinity) without affecting the Tg. The Tg can be regulated by the presence of cycloaliphatic or arylaliphatic diamines in order to increase it or of amino acids, aliphatic diacids and aliphatic diamines in order to reduce it. The Tm can be adjusted by the choice of the crystalline unit (10.T or 6.T) and subsequently by copolymerization. In general, the more aromatic and optionally cycloaliphatic units there are, the higher will be the Tg, as will be the Tm in the case of a semicrystalline polymer.

More particularly, the Tm of said thermoplastic polymer lies within a range extending from 200 to 320° C., preferably from 200 to 300° C. and more preferably from 240 to 300° C. The advantage of using a semicrystalline thermoplastic polymer lies in the fact that the crystalline regions in the amorphous region of this polymer reinforce the amorphous domain of the polymer and improve the mechanical strength under hot conditions, in particular the breaking stress and especially the creep strength.

More specifically, in the preferred case where said thermoplastic polymer is a semicrystalline polyamide, it has a melting point temperature Tm and a crystallization temperature Tc. In this case, the difference between the melting point temperature Tm of said polyamide and its crystallization temperature Tc is in particular less than 100° C., preferably less than or equal to 80° C. and more preferably less than 50° C. The choice of such a thermoplastic polymer makes it possible to facilitate the removal of the composite material from the mold at a temperature of less than Tc (by cooling to this temperature).

The thermoplastic polymer can also be amorphous and more particularly it can be an amorphous polyamide. In this case, it can be chosen, for example, from polyamides based on a structure derived from cycloaliphatic or arylaliphatic diamine in combination with an aliphatic diacid or from isophthalic acid in combination with an aliphatic diamine. The Tg is increased by the presence of isophthalic and cycloaliphatic units and reduced by the presence of aliphatic units. Mention may be made, as examples of amorphous polyamides suitable for the invention, of the preceding polyamides where terephthalic (T) is replaced with isophthalic (I) as acid in the structure of the polyamide until the melting point disappears.

Mention may be made, as examples of suitable amorphous polyamides (amorphous means the disappearance of the melting point measurable by DSC) for the process of the invention, for example, of homopolyamides or copolyamides corresponding, for example, to one of the following formulae:

BMACM.T, BMACM.I, BMACM.6, BMACM.10, BMACM.12, BMACM.14, BMACM.1,4-CHDA or by replacing, in these formulae, all or part of the BMACM with IPDA or combinations of these compositions and/or with addition of 11, 12, 6.10, 6.12, 9.10, 9.12, 10.10, 10.12 structures, with:

BMACM: bis(3-methyl-4-aminocyclohexyl)methane
BACM: bis(aminocyclohexyl)methane
IPDA: isophoronediamine.

When the thermoplastic polymer is a mixture of thermoplastic polymers, for example of polyamide and polyester, it is preferable, in order to provide the material with good mechanical strength, for the polymers involved, for example the polyamide and the polyester, to be compatible. Generally, two polymers are said to be "compatible" if it is possible to mix them so as to obtain a material exhibiting a homogeneous mechanical strength with a glass transition temperature Tg of the mixture which is an intermediate Tg with respect to the two respective Tg values, it being possible for the intermediate Tg to be calculated from the Fox relationship.

Within the meaning of the invention, a "mixture" of polyamide and polyester can, of course, mean a mixture of polyamide-polyester copolymer and polyamide or also a mixture of polyamide-polyester copolymer and polyester. The presence of a copolymer based on two candidate polymers for the mixture is sometimes necessary in order to overcome the problem of compatibility between the two candidate polymers for the mixture.

In accordance with the process for the manufacture of the composite material according to the invention, the thermoplastic polymer impregnating said assemblage of reinforcing fibers is formed during the polymerization stage ii) by bulk addition reaction in the precursor composition comprising a) a prepolymer of the thermoplastic polymer with b) a chain extender as defined above according to the invention. The thermoplastic polymer of the finished (final) matrix corresponds to that obtained in the case where the polymerization reaction of stage ii) is complete and not partial; for example, it corresponds to the polymer obtained after the final processing of the composite material by molding in stage iii) and, if necessary, after an optional annealing stage.

As regards the synthetic reinforcing fibers involved in the process of the invention described above, they are preferably long fibers, which means, according to the invention, having a shape factor>1000 (that is to say, ratio of length to diameter of the fiber). They can be continuous, such as fabrics (2D), laps, strips or plaits, such as nonwovens or such as unidirectional reinforcements (UD). They can also be cut up, for example in the form of nonwovens (mats) or in the form of felts.

These synthetic reinforcing fibers can be chosen from:

mineral fibers, these having high melting point temperatures Tm' which are greater than the Tg of said polymer (in the case of an amorphous polymer) or greater than the melting point temperature Tm (case of a semicrystalline polymer) and greater than the polymerization and processing temperature. They can range up to 2050° C., polymer fibers, provided that they have a melting point Tm' or, for lack of Tm', a glass transition temperature Tg' which is greater than the polymerization temperature (i.e., greater than the Tg of the matrix of the composite, if it is amorphous, or greater than the melting point Tm of this matrix, if it is semicrystalline, and greater than the processing temperature). Preferably, Tm' is greater than 350° C. in the case where the polymerization temperature lies within the upper limit of the abovementioned range corresponding to 340° C., or the mixtures of the abovementioned fibers.

Mention may be made, as mineral fibers suitable for the invention, of carbon fibers, which includes carbon nanotube (CNT) fibers, carbon nanofibers or graphenes; silica fibers, such as glass fibers, in particular of E, R or S2 type; boron fibers; ceramic fibers, in particular silicon carbide fibers, boron carbide fibers, boron carbonitride fibers, silicon nitride fibers, boron nitride fibers or basalt fibers; fibers or filaments based on metals and/or their alloys; fibers of metal oxides, in particular of alumina ($Al_2O_3$); metalized fibers, such as metalized glass fibers and metalized carbon fibers; or the mixtures of the abovementioned fibers.

More particularly, these synthetic fibers can be chosen as follows:

the mineral fibers can be chosen from: carbon fibers, carbon nanotube fibers, glass fibers, in particular of E, R or S2 type, boron fibers, ceramic fibers, in particular silicon carbide fibers, boron carbide fibers, boron carbonitride fibers, silicon nitride fibers, boron nitride fibers or basalt fibers, fibers or filaments based on metals and/or their alloys, fibers based on metal oxides, such as $Al_2O_3$, metalized fibers, such as metalized glass fibers and metalized carbon fibers, or the mixtures of the abovementioned fibers, and the polymer fibers, under the abovementioned condition, are chosen from:

fibers of thermosetting polymers, more particularly chosen from: unsaturated polyesters, epoxy resins, vinyl esters, phenolic resins, polyurethanes, cyanoacrylates and polyimides, such as bismaleimide resins, aminoplasts resulting from the reaction of an amine, such as melamine, with an aldehyde, such as glyoxal or formaldehyde, fibers of thermoplastic polymers, more particularly chosen from: polyethylene terephthalate (PET), polybutylene terephthalate (PBT), high-density polyolefins, such as polyethylene (PET), polypropylene (PP) and PET/PP copolymers, or PVOH (polyvinyl alcohol), fibers of polyamides corresponding to one of the formulae: 6, 11, 12, 6.10, 6.12, 6.6, 4.6, fibers of aramids (such as the Kevlar®) and aromatic polyamides, such as those corresponding to one of the formulae: PPD.T, MPD.I, PAA and PPA, with PPD and MPD respectively being p- and m-phenylenediamine, PAA being polyarylamides and PPA being polyphthalamides, fibers of block copolymers of polyamide, such as polyamide/polyether, or fibers of polyaryletherketones (PAEK), such as polyetheretherketone (PEEK), polyetherketoneketone (PEKK) or polyetherketoneetherketoneketone (PEKEKK).

The preferred synthetic reinforcing fibers are long fibers chosen from: carbon fibers, including metalized carbon fibers, glass fibers, including metalized glass fibers, of E, R or S2 type, fibers of aramids (such as Kevlar®) or aromatic polyamides, fibers of polyaryletherketones (PAEK), such as polyetheretherketone (PEEK), polyetherketoneketone (PEKK) or polyetherketoneetherketoneketone (PEKEKK), or their mixtures.

The fibers more particularly preferred are chosen from: glass fibers, carbon fibers and aramid (such as Kevlar®) fibers or their mixtures.

The assemblage of fibers involved in said process of the invention as described above can be an assemblage of continuous fibers, such as fabrics, or an assemblage of short fibers, such as felts and wovens, which can be provided in the form of strips, laps, plaits, tufts or pieces. According to one embodiment of the invention, the assemblage of fibers represents contents of 40% to 70% by volume and preferably of 50% to 65% by volume of said composite material. Said assemblage of fibers can be random (mat), unidirectional (UD) or multidirectional (2D, 3D or other). Its grammage, that is to say its weight per square meter, can range from 100 to 1000 g/m², preferably from 200 to 700 g/m².

In addition to the assemblage of the abovementioned fibers, the composite material manufactured according to the invention can comprise fillers in the dispersed state in the thermoplastic polymer impregnating said assemblage of fibers or fibrous assemblage. They can be any filler known to a person skilled in the art in the field of composites. They can in particular be conducting fillers, such as metal powder, pulverulent carbon black, carbon fibrils, carbon nanotubes (CNT), silicon carbide, boron carbonitride, boron nitride or silicon nitride. Reference may be made, on this subject, to the application WO 2010/130930 of the applicant company.

These fillers in said fibrous material can represent, for example, from 0.1% to 30% by weight, preferably from 0.3% to 5% by weight, of the thermoplastic polymer.

According to the invention, the process comprises a first impregnation stage i), a second polymerization stage ii) and a third final processing stage iii) for said composite material. This processing can be carried out by different techniques chosen from: pultrusion, filament winding, thermocompression, infusion molding, resin transfer molding (RTM), structural reaction injection molding (S-RIM) or injection/compression molding. A specific closed-mold technique is RTM or S-RIM or injection/compression molding.

According to an alternative form of the process for the manufacture of said composite material according to the invention, the polymerization of stage ii) is optionally completed, after the processing stage iii), by a separate final stage comprising an annealing of said final composite material. This annealing stage thus makes it possible to complete the reaction for polymerization by polyaddition in the case where this reaction is only partial during the processing. In this case of partial or incomplete polymerization, the composite material obtained after the processing stage ii) is a solid and does not present handling problems for its annealing in a separate treatment stage.

Depending on the conditions for physical and time-related implementation of the impregnation stage i) with respect to the processing iii), it is possible to distinguish different scenarios and corresponding processing techniques which can be applied.

According to a first possibility of the process, the impregnation stage i) is carried out in the mold for the final processing of said composite. More specifically, this is the case for a process with a closed-mold processing stage, such as RTM, S-RIM or infusion molding or injection/compression molding. More particularly, according to this possibility, said impregnation stage i) can comprise a direct transfer of said precursor composition in the molten state onto said assemblage of fibers and, preferably, said assemblage of fibers is a preform of fibers which is positioned beforehand in said processing mold.

Said direct transfer can be carried out in the molten state by extrusion of said prepolymer with addition of said extender in the extrusion screw or preferably with addition of said extender downstream of the extruder by means of a mixer.

According to this first possibility of implementation of said process as described above, said processing stage iii) is carried out in a closed mold with resin transfer molding (RTM), structural reaction injection molding (S-RIM) or infusion molding or injection/compression molding.

According to a more specific possibility, the impregnation stage i) is separated in time from the polymerization stage ii) and the final processing stage iii). This means that the impregnation takes place before the polymerization, in particular here in the processing mold. More particularly, in said process, the polymerization stage ii) and the processing stage iii) can be simultaneous.

According to another possibility for the process according to the invention, said processing stage iii) can be carried out in an open mold, such as by pultrusion through a (shaping) heating die, with optional additional conversion of the semi-finished products thus obtained, in particular by superposition of UD bands thus obtained, by the AFP (Automatic Fiber Placement) technique or by thermocompression.

In the case of the Automatic Fiber Placement (AFP) technology using a laser heating mode to weld the composite bands to one another, said precursor composition can comprise specific additives which absorb at the wavelength of the laser (in particular UV or IR laser), in particular when the composite bands are based on glass fibers or carbon fibers and preferably glass fibers.

According to another alternative form of the process of the invention, the impregnation stage i) is carried out outside the mold for the final processing of said composite. According to this process, said stage i) of impregnation in the molten stage comprises a preliminary stage of dusting said assemblage of fibers with said precursor composition in the powder (solid) state, followed by a stage of heating and melting said powder and optionally by a calendaring stage, thus making it possible to obtain a preimpregnated fibrous material as intermediate product, before the polymerization stage ii) and the final processing stage iii).

According to an equivalent alternative form of this process according to the invention, said stage of impregnation i) in the molten state can comprise a stage of coating, in a fluidized bed, said assemblage of fibers with a powder of said precursor composition, followed by heating and melting said powder, thus making it possible to obtain a preimpregnated fibrous material as intermediate product, before the polymerization stage ii) and the final processing stage iii).

According to these two alternative process forms, a preimpregnated fibrous material is obtained as intermediate product of inclusion of the impregnation stage i). In this process, the polymerization stage ii) and the processing stage iii) are carried out by using said preimpregnated fibrous material as starting material (raw material) to be converted in order to obtain said final composite material.

In this case, the processing stage iii) can be carried out in particular by thermocompression or by lamination of at least one preimpregnated fibrous material resulting from said impregnation stage i), in particular with said prepreg being based on an assemblage of fibers, such as UD fabrics, 2D fabrics or nonwovens, the stage optionally completed by a final shaping by thermoforming or stamping. The stamping is carried out under cold conditions after a preheating of the prepreg.

According to a more specific process case according to the invention, said processing stage iii) comprises the positioning of at least two preimpregnated fibrous materials resulting from said impregnation stage i) on a mold preform, in staggered fashion, so that they are at least partially superimposed, until the desired thickness is obtained.

The preimpregnated assemblage (or preimpregnated fibrous material) can also be shaped by thermocompression in order to produce a preform which can subsequently be used in an RTM, infusion or SRIM molding process or by thermocompression.

In the specific case where the thermoplastic matrix polymer is semicrystalline, said process for the manufacture of said composite material according to the invention as set out above can comprise a stage of removing said composite material from the mold at a temperature which is less than the crystallization temperature Tc of said polymer and more particularly of the polyamide polymer.

Said process for the manufacture of a composite material according to the invention makes possible the use of composite materials as mechanical or structural parts, more particularly obtained by molding or by pultrusion or by filament winding or by automatic fiber placement (AFP), more particularly composite parts (mechanical or structural parts) for applications in the following fields: aeronautics, the motor vehicle industry, the railroad industry, road transportation, wind power (in particular wind turbine blades), photovoltaics, sports and leisure, including water sports, the construction industry or civil engineering, more particularly still being composite parts chosen from: profiled reinforcements, hulls, such as a boat hull, panels, including sandwich panels, composite tanks, such as a motor vehicle tank, composite pipelines, such as pipes for the pumping and transportation of oil or gas, hollow bodies, an aircraft wing, an aircraft fuselage, a beam or a partition in a house or a boat, a side rail, a spoiler, a motor vehicle housing, a brake disk, an actuating cylinder or a steering wheel, a motor vehicle body, a railroad car, a footwear sole or a golf club.

The present invention also covers a precursor composition (precursor of the thermoplastic matrix) which makes possible the implementation of the process for the manufacture of said composite material as defined above according to the present invention, said composition comprising a) at least one prepolymer $P(X)_n$ and b) at least one chain extender, which can be represented by Y-A-Y, said prepolymer and said extender being as defined above and below according to the present invention, with a thermoplastic polymer resulting from said composition by bulk polyaddition reaction and having a glass transition temperature of greater than or equal to 80° C., preferably from 100 to 200° C., more preferably from 110 to 200° C. and more preferably still from 110° C. to less than 180° C. and more particularly from 120 to 170° C. Said composition can be in the form of granules or in the form of a fine powder which can be obtained after extrusion of said prepolymer $P(X)_n$ according to the invention, with addition of said extender according to the invention in the extrusion screw or downstream of the extruder using a mixer, the mixture obtained being granulated and finely ground in order to obtain said powder.

In fact, this precursor composition is based on a mixture of two components: a) prepolymer and b) extender, as defined above according to the invention.

This precursor composition can comprise additives and fillers. As regards these fillers, they can be any filler known to a person skilled in the art in the field of composites. They can in particular be fillers which conduct heat and/or fillers which conduct electricity, such as metal powder, pulverulent carbon black, carbon fibrils, carbon nanotubes (CNT), silicon carbide, boron carbonitride, boron nitride or silicon nitride. Reference may be made, on this subject, to the application WO 2010/130930 of the applicant company. These fillers can represent from 0.1% to 30% by weight, preferably from 0.3% to 15% by weight, of the (final) thermoplastic polymer. As regards the additives, the precursor composition, according to a preferred alternative form of the invention, more particularly comprises specific additives which can absorb at the wavelength of a laser, such as, for example, a UV or IR laser, this making possible the use of the automatic fiber placement (AFP) technology, in the case where this uses a laser heating mode, to weld the composite bands to one another, this in particular in the case of composite bands based on glass fibers and carbon fibers, preferably glass fibers. Other additives, such as heat stabilizers, can be added to the precursor composition and can thus be present in the final thermoplastic composite material as used in the final applicational parts, these stabilizers being in particular antioxidants which counteract the thermal oxidation and/or photooxidation of the polymer of the thermoplastic matrix. Said antioxidants are of sterically hindered phenol and/or sterically hindered amine (known under the everyday name HALS) type. Mention may be made, as suitable examples of such additives, of: carbon black (CB) in the form of CB powder or, preferably, in the form of masterbatches based on CB and polyethylene (PE) or on CB and polyamide (PA), $TiO_2$ (titanium oxide), ZnO (zinc oxide) and, in the case of an IR laser, indium tin oxide (sold by Evonik), and the heat stabilizers as mentioned above. Mention may be made, as example of CB+PE masterbatch with approximately 40% of CB, of Euthylen®, sold by BASF. Mention may be made, as example of CB+PA masterbatch with approximately 15% of CB, of Renol® Black, sold by Clariance.

The invention also covers a composition of or for a composite material comprising, in addition to said specific precursor composition of the invention, said assemblage of one or more synthetic reinforcing fibers as is defined according to the invention.

The present invention also covers a preimpregnated fibrous material, as intermediate product or as semifinished product, which results from the impregnation in the molten state of an assemblage of one or more synthetic reinforcing fibers as is defined above with at least one precursor composition as defined according to the invention.

More particularly, said preimpregnated fibrous material results from an impregnation stage i) comprising the dusting of said assemblage of fibers with a precursor composition in the powder form or it can be obtained after an impregnation stage i) comprising the coating of said assemblage of fibers with said powder in the fluidized bed.

Another subject matter of the invention is the use of a precursor composition as defined above for the impregnation of an assemblage of one or more synthetic reinforcing fibers, for the manufacture of a preimpregnated fibrous material as defined above, more particularly for the manufacture of a composite material.

The use of a precursor composition as defined according to the invention for the manufacture of a composite material and more particularly of a molded composite part and preferably a mechanical or structural part is also concerned. The structural part encompasses both structural parts and semistructural parts.

Finally, the invention covers, as finished product, a composite material which is obtained according to a manufacturing process as defined according to the invention and more particularly by using at least one precursor composition as defined according to the invention for the impregnation stage i) and for the polymerization stage ii).

More particularly, said composite material according to the invention makes it possible to manufacture composite parts for applications in the following fields: aeronautics, the motor vehicle industry, the railroad industry, road transportation, windfare, photovoltaics, sports and leisure, including water sports, construction or civil engineering, and in particular profiled reinforcements, hulls, such as a boat hull, panels, including sandwich panels, composite tanks, such as a motor vehicle tank, composite pipelines, such as pipes for the pumping and transportation of oil or gas, hollow bodies, an aircraft wing, an aircraft fuselage, a beam or a partition in a house or a boat, a side rail, a spoiler, a motor vehicle housing, a brake disk, an actuating cylinder or a steering wheel, a motor vehicle body, a railroad car, a footwear sole or a golf club.

General Definitions Valid for the Whole of the Description

Unless otherwise mentioned, the percentages are given as values by weight.

"Fibers" is understood to mean, in the context of the present invention, synthetic reinforcing fibers for the composite material and more particularly long reinforcing fibers. The long fibers according to the invention exhibit a shape factor (L/D, length to diameter)>1000.

Tg, Tm Tc, Tg', Tm': all these temperatures measured by DSC: according to ISO 11357-2 for the glass transition temperatures and according to ISO 11357-3 for the melting points and crystallization temperatures. The measurements are carried out in $2^{nd}$ heat, for the PAs on samples not dried beforehand.

"Precursor composition" means, for the present invention, that this composition is the precursor of the thermoplastic matrix or it is the composition from which said thermoplastic matrix having the Tg indicated results.

A polymer "based on aromatic structure" or "semiaromatic" polymer for the thermoplastic polymer and consequently for the corresponding prepolymer $P(X)_n$, more particularly for a polyamide or polyester, means the presence of aromatic structure in the units of said polymer or prepolymer, that is to say that this polymer or prepolymer comprises an aromatic structure in its units, preferably with at least 25 mol % of its units comprising said aromatic structure.

An analogous meaning is given for a polymer "based on a cycloaliphatic structure" or "semicycloaliphatic" polymer. Such a thermoplastic polymer and consequently corresponding prepolymer $P(X)_n$, more particularly a polyamide or polyester, means the presence of cycloaliphatic structure in the units of said polymer or prepolymer, that is to say that this polymer or prepolymer comprises a cycloaliphatic structure in its units, preferably with at least 25 mol % of its units comprising said cycloaliphatic structure.

"Semicrystalline" means, for the thermoplastic polymer of the invention, a polymer which exhibits a melting peak, measured in DSC, according to the abovementioned standard.

A few more detailed additional specifications relating to various parameters of the invention are given below and by parameter considered. These specifications can supplement the specifications set out above by subject matter claimed, by combination of the specification already mentioned for the parameter involved with these additional specifications, and this applies to all the subject matters claimed or which may be claimed.

Assemblage of Fibers

The fibers involved in said assemblage are long fibers, which means exhibiting a shape factor of >1000, which can be continuous or cut. Said assemblage of long fibers can be based on continuous fibers and can be a fabric (2D fabrics), unidirectional (UD) band or a nonwoven. Said assemblage can also be based on cut long fibers in the form of a nonwoven (mats of fibers) or felt. Said fibers are preferably continuous.

"Synthetic fibers" is understood to mean mineral fibers or synthetic organic fibers and more particularly, for the latter, (nonnatural) polymer fibers or a mixture of such mineral fibers and polymer fibers. They are defined in contrast to "natural fibers", which are by definition excluded according to the invention from the term "synthetic".

Thermoplastic Polymer

The assemblage of fibers participating in the manufacture of the composite material according to the invention is impregnated with at least one thermoplastic polymer having a glass transition temperature Tg of greater than or equal to 80° C. with the abovementioned preferences. This thermoplastic polymer can be a thermoplastic homopolymer or copolymer or a mixture of at least two of these thermoplastic polymers as defined here. It should be noted that said thermoplastic polymer corresponds to the polymer of the final thermoplastic matrix obtained, of said composite material, in the case where the polymerization is complete, at the end of the processing stage iii). This thermoplastic polymer, having a Tg at least equal to 80° C., thus corresponds, in the case of the present invention, to the product of the reaction for bulk polymerization by (poly)addition in the molten state of said precursor composition, comprising a) at least one reactive prepolymer $P(X)_n$ for said thermoplastic polymer and b) at least one chain extender, which may be represented by Y-A-Y, as are defined above according to the invention. Consequently, the chain of the final thermoplastic polymer (after complete polymerization of the precursor composition) is composed of the sequence of said prepolymers $P(X)_n$ joined (linked) together via at least one chain extender defined according to the invention (one or more extenders acting as "junctions" between the prepolymer chains), by reaction between the X and Y functional groups, as are defined above according to the invention.

According to one embodiment of the invention, the thermoplastic polymer is chosen from: a polyamide, a polyester, their copolymers and/or their mixtures. Preferably, the thermoplastic polymer is a polyamide.

Prepolymer $P(X)_n$

"Prepolymer" for said thermoplastic polymer is understood to mean an oligomer of the thermoplastic polymer comprising a molecular chain P composed of repeat units identical to those of said thermoplastic polymer (but much less in number of units), with this chain possessing, at its ends, n reactive groups or functional groups X, with n ranging from 1 to 3, preferably n being 1 or 2 and more preferably 2. The reactive functional groups X are identical to one another and, by definition, they cannot react with one another.

By virtue of the presence of the reactive functional groups X at the ends of its molecular chain, said prepolymer is capable of bulk polymerizing by addition reaction in the molten state with a chain extender as defined above according to the invention and as defined additionally below.

By definition, the prepolymer $P(X)_n$ according to the invention cannot be crosslinked. It can give rise, by (poly) addition reaction with the extender as defined according to the invention, only to a linear polymer, possibly slightly branched, which remains by definition a thermoplastic polymer constituting the matrix of said final composite material which results therefrom. Thus, the final composite material remains readily recyclable by simple heating of said composite material to be recycled, so as to obtain the melting of said thermoplastic polymer as matrix impregnating said synthetic fibers, followed by the separation in the molten state of said fibers with respect to said thermoplastic polymer in question.

Chain Extender

"Chain extender", which can in particular be represented by Y-A-Y, should be understood as meaning a hydrocarbon molecular chain A having (or carrying or comprising), at each of its ends, a reactive functional group Y (two Y functional groups per extender chain or molecule) which reacts with at least one of said reactive functional groups X of said prepolymer $P(X)_n$. The reactive functional groups Y are identical to one another and they cannot react with one another but only and specifically with the X functional groups of said prepolymer. A is the molecular residue carrying said two identical groups or functional groups Y. Said extender is nonpolymeric (neither polymer nor oligomer) and has a molecular weight of less than 500 and preferably of less than 400.

It should be noted that the definition of "chain extender" within the meaning of the invention differs completely in terms of technical function from that of a "coupling agent", commonly used for a composite material comprising fibers impregnated with a polymer matrix but to denote a compound which facilitates the adhesion between the fibers and the polymer matrix ("coupling" concerning the fiber/polymer interface). Unlike a chain extender as defined according to the present invention, a "coupling agent" is not in any way involved in the polymerization as defined by the present invention in order to obtain said thermoplastic polymer.

The choice of said chain extender will depend on the nature of the reactive functional group X of the prepolymer $P(X)_n$ as described above.

Precursor Composition

The precursor composition according to the invention comprises a) at least one prepolymer and b) at least one chain extender as are defined above according to the invention.

The content of chain extender or of prepolymer $P(X)_n$ in the precursor mixture will depend on the molecular weight of each and also on the Y/X molar ratio. For example, for n=2, this Y/X ratio lies between 0.5 and 1.5 depending on the molecular weight targeted for the final thermoplastic polymer. The closer it approaches 1, the more the number-average molecular weights Mn will have a tendency to increase for the final thermoplastic polymer.

The term "precursor" means precursor of the thermoplastic matrix having the final Tg specified. This means that this thermoplastic matrix results from the bulk polymerization reaction of said precursor composition in the molten state.

The precursor mixture can in addition comprise one or more additives chosen, for example, from conducting fillers (conducting heat and/or electricity), such as carbon black, carbon nanotubes, optionally a catalyst as set out above.

Composite Material and Manufacturing Stages

The composite material is the final product obtained by using the precursor composition and the process of the present invention.

Impregnation Stage i)

The "impregnation stage" comprises an impregnation of said assemblage by said precursor composition in the fluid state, which corresponds to the molten state obtained at a temperature which makes possible the melting of said prepolymer and extender, so that, during the impregnation in stage i), the viscosity of the mixture (precursor composition) does not exceed 100 Pa·s, preferably does not exceed 50 Pa·s, under the impregnation conditions (in particular temperature).

Use may be made of one or more prepolymers. When different prepolymers $P(X)_n$ are used, their simultaneous addition or, by contrast, consecutive addition makes it possible to obtain a polymer having a more or less pronounced random or sequential nature.

It is also possible to use one or more fibrous assemblages.

The impregnation of the assemblage of fibers can, for example, be carried out by placing the assemblage of fibers in a bath comprising the precursor composition in the molten state, that is to say the prepolymer and the extender (as a mixture) in the molten state.

More particularly, it is also possible to deposit said precursor composition in the molten state by direct transfer in the molten state onto said fibrous assemblage, which can be positioned beforehand in a processing mold and more particularly in a closed mold, in particular when use is made of a technique for processing by RTM or S-RIM or by infusion molding or by injection/compression molding.

The impregnation of the assemblage of fibers can also comprise, as set out above, a dusting of said assemblage with said precursor composition in the form of a powder, followed by heating, in order to obtain the melting of said composition, and optionally followed by calendaring.

Likewise, said impregnation can comprise the coating of said fibrous assemblage in a fluidized bed with a fine powder of said precursor composition kept suspended in the air. In the latter case, said assemblage of fibers is passed into a fluidized bed of fine powder particles of said precursor composition, said powder subsequently being heated in order to obtain the melting of said composition, optionally followed by calendaring. The prepolymer with the extender (precursor composition), in the pulverulent form, can be deposited on an assemblage of fibers in the fabric form, as described in the document FR 2 562 467 or EP 0 394 900. In these last two cases of precursor composition in the powder state, with dusting or in a fluidized bed, a preimpregnated fibrous material is obtained, after impregnation in the molten state of stage i), as semi-finished intermediate product which can be used as such in the processing of stage iii) of said final composite material. Said prepreg is generally in the preimpregnated fabric (or thin sheet) form and can subsequently be used as starting material for the stage of processing the final composite material. For example, a final composite part can be obtained by thermocompression of said preimpregnated material. Likewise, several prepregs can be superimposed and converted into a sheet by thermocompression or by lamination (with calendaring), it being possible for said sheet to be finally shaped by thermoforming (under hot conditions) or by stamping (under cold conditions after a preheating of the prepreg).

The dusting with powder can be carried out using a vibrating support (sieve), in order to make possible the homogeneous distribution of the powder on said assemblage.

Another specific impregnation possibility comprises the direct transfer in the molten state of a stream of the precursor composition onto the assemblage of fibers, which is provided in the fabric, lap or strip or plait form. For example, this transfer can be carried out by extrusion of said prepolymer, to which said extender has been added, in the extrusion screw or downstream of the extruder using a mixer, for example static mixer. In particular, this can be carried out in the processing mold on an assemblage of fibers which is a preform of said fibers, more particularly for processing in a closed mold, such as by RTM or S-RIM or by infusion molding or injection/compression molding.

The impregnation stage i) can be carried out under pressure, preferably ranging from 1 to 30 bar, preferably from 1 to 10 bar.

The impregnation stage i) can also be carried out by the film stacking process, namely by compression under hot conditions of a stack of assemblages of fibers and of films of precursor composition (prepolymer mixed with the chain extender).

The precursor composition according to a preferred alternative form more particularly comprises, among the additives and other fillers possible, specific additives which can absorb at the wavelength of a laser, in particular of a UV or IR laser, more particularly by using the automatic fiber placement (AFP) technology, in the case where this uses a laser heating mode to weld the composite bands to one another, this in particular in the case where the composite bands are based on glass fibers or carbon fibers and preferably glass fibers.

When it is desired to incorporate conducting fillers in the precursor composition in the molten state, it can be advantageous to carry out heating by microwaves or by induction. Here again, reference may be made to the application WO 2010/130930 of the applicant company.

Polymerization Stage ii)

Stage ii), known as "polymerization stage", comprises a bulk polymerization by polyaddition reaction in the molten state of said prepolymer with said chain extender.

The chain extender, which is introduced into the prepolymer in the molten state (the mixture being the precursor composition), remains not very active or inactive as long as the polymerization reaction temperature as already indicated above is not reached.

The polymerization temperature is at least greater than the melting point or, for lack of melting, than the glass transition temperature of said prepolymer and optionally of said extender and it is in particular greater than the targeted Tg of said thermoplastic polymer. It is located in particular from 150 to 340° C. and preferably from 200 to 320° C. and more preferably from 200 to 300° C.

According to one embodiment of the invention, the polymerization may not be complete (total) after the processing stage iii), in particular during the molding. If necessary, depending on the polymerization conversion, an additional annealing (heat treatment) stage can be carried out in order to complete this polymerization.

Processing iii) Said Final Composite Material

After the stage ii) of polymerization of the precursor composition, a solid thermoplastic matrix is obtained, which allows it to be shaped by a processing stage for the manufacture of a composite material and more particularly of a composite part which can be in three dimensions (3D).

The processing iii) can be carried out simultaneously with the polymerization stage ii) or else immediately after this stage.

For the production of a composite material and more particularly of a composite part, for example in 3D, the polymerization temperature in stage ii) and the processing temperature in stage iii) is greater than the targeted glass transition temperature Tg for said thermoplastic polymer.

According to a specific embodiment, the processing of the composite material consists in depositing at least two pre-impregnated fibrous materials as described above on a mold preform, in staggered fashion, so that they are at least partially superimposed, until the desired thickness is obtained. It is possible to heat by means of a laser in order to weld the prepregs to one another, the preform subsequently being removed. The precursor composition can then comprise a specific additive which absorbs at the wavelength of said laser, in particular when it is a UV or IR laser, and said prepreg is based on glass fibers or carbon fibers, preferably glass fibers.

According to other embodiments, said processing of the composite material is carried out by one of the following known techniques:
 calendaring,
 rolling,
 pultrusion,
 thermocompression,
 resin transfer molding (RTM),
 structural reaction injection molding (SRIM),
 injection/compression molding,
 a filament winding technique,
 or else a combination of these techniques, as the case may be.

The impregnation stage i), the polymerization stage ii) and the processing iii) of the final composite material can advantageously be carried out in the same mold, for example in a closed mold during processing by RTM or S-RIM or infusion molding or injection/compression molding. These processes are particularly preferred.

It is possible, for example, to inject the prepolymer, as a mixture with the chain extender (precursor composition), in the molten state into a molding chamber comprising at least one assemblage of fibers as described above. The interior of the chamber can be at a temperature which is greater by more than 50° C. than the melting point of the prepolymer and/or of the extender. After polymerization, it is possible to cool the molding chamber and the molded part in order, finally, to obtain said final composite part.

A 3D part, in particular a mechanical or structural part, manufactured according to the invention can also have a structure of sandwich type comprising a "core" extending between two external layers known as "skins", said skins comprising at least one composite material according to the invention. The core preferably exhibits a lower density, with respect to said composite material. It can be a honeycomb or foam core. The skins and the core can be assembled by any means/process known to a person skilled in the art, for example by adhesive bonding or by welding.

A composite part, in particular a 3D composite part, manufactured according to the invention can be a mechanical or structural part, in particular for the manufacture of an aircraft wing, an aircraft fuselage, a boat hull, a side rail, a motor vehicle spoiler, a brake disk, an actuating cylinder or a steering wheel.

More generally, the composite materials and more particularly the composite parts (including in three dimensions 3D) in accordance with the invention can be used in numerous fields, such as aeronautics, the space sector, the motor vehicle industry, the naval industry, energy, the railroad industry, wind power, photovoltaics, sports and leisure, including water sports, the construction industry or civil engineering and more particularly profiled reinforcements, hulls, such as a boat hull, panels, including sandwich panels, composite tanks, such as a motor vehicle tank, composite pipelines, such as pipes for the pumping and transportation of oil or gas, hollow bodies, an aircraft wing, an aircraft fuselage, a beam or a partition in a house or a boat, a side rail, a spoiler, a motor vehicle housing, a brake disk, an actuating cylinder or a steering wheel, a motor vehicle body, a railroad car, a footwear sole or a golf club.

Measurement Methods:

Melt Viscosity

The melt viscosity of the prepolymer or of the precursor composition is measured according to the reference manual of the manufacturer of the measurement device used, which is a Physica MCR301 rheometer, while flushing with nitrogen at the given temperature of shearing at 100 s$^{-1}$ between two parallel planes having a diameter of 50 mm.

The Molecular Weight Mn

The Mn of the thermoplastic prepolymer or polymer is determined from the assaying (titration) of the X end functional groups according to a potentiometric method (back titration of an excess reagent with respect to the OH end functional groups and direct titration for NH$_2$ or carboxyl) and from the theoretical functionality n calc (vs. X) calculated from the material balance and from the functionality of the reactants (see in description the general calculation method).

The measurement of the intrinsic viscosity is carried out in m-cresol. The method is well known to a person skilled in the art. The standard ISO 937 is followed but while changing the solvent (use of m-cresol instead of sulfuric acid and the temperature being 20° C.).

The glass transition temperature Tg of the thermoplastic polymers used or of the polymer fibers (Tg') used is measured using a differential scanning calorimetry (DSC), after a 2$^{nd}$ heat pass, according to the standard ISO 11357-2. The heating and cooling rate is 20° C./min.

The melting point temperature Tm (or Tm') and the Tc are measured by DSC, after a 1$^{st}$ heat, according to ISO 11357-3. The heating and cooling rate is 20° C./min.

A) Preparation of the Prepolymers P(X)$_n$

Example 1: Amorphous Diacid Polyamide (PA) Prepolymer 10.I/6.I

Example 2: Amorphous Diamine Polyamide (PA) Prepolymer 10.I/6.I

The procedure is the same for both examples 1 and 2 with different material balance as shown below.

The following are successively (and by cited example 1 and 2) introduced into an autoclave reactor with a capacity of 14 liters:

|  | Ex. 1 | Ex. 2 |
| --- | --- | --- |
| 1,6-Hexanediamine (HMDA) | 539.2 g | 523.0 g |
| 1,10-Decanediamine | 1891.3 g | 2534.1 g |
| Isophthalic acid | 3454.7 g | 2569.0 g |
| Rhodorsil RG22 | 3.0 g | 3.0 g |
| NaH$_2$PO$_2$, 60% in water | 24.0 g | 24.0 g |
| Water | 2000.0 g | 2000.0 g |

Rhodorsil RG22, an antifoaming agent, is sold by Bluestar Silicones.

After closing the reactor, the atmosphere is purged of its oxygen with nitrogen. The reactor is subsequently heated to 250° C. inside, the pressure in the reactor reaching 32 bar. The water is gradually removed from the reactor by reduction in pressure over 1 hour down to atmospheric pressure while maintaining an internal temperature of approximately 240° C. The reactor having arrived at atmospheric pressure is subsequently flushed with nitrogen at 180 l/h for 15 minutes. The contents of the reactor are subsequently emptied and cooled in water. After filtering, coarse grinding and drying, 5300 g (ex. 1) and 4950 g (ex. 2) of prepolymers are collected.

It may be noted, from the raw material charging above, that all the reactants are of functionality 2 and that none is of functionality 1 or 3. The concentrations [M] and [B] are thus zero and the functionality n calc of the prepolymer from the formula described above is 2.

Example 3: Amorphous Diacid Polyamide Prepolymer, 11/BMACM.I/BMACM.T

The following are successively introduced into an autoclave reactor with a capacity of 14 liters:

| 11-Aminoundecanoic acid | 2325.8 g |
| --- | --- |
| BMACM | 2754.5 g |
| Isophthalic acid | 959.4 g |
| Terephthalic acid | 2241.1 g |
| Rhodorsil RG22 | 3.5 g |
| Water | 350.0 g |

After closing the reactor, the atmosphere is purged of its oxygen with nitrogen. The reactor is subsequently heated in order to reach 240° C. inside, the pressure in the reactor reaching 25 bar. The water is gradually removed from the reactor by reduction in pressure down to atmospheric pressure while maintaining an internal temperature of approximately 240° C. The reactor having arrived at atmospheric pressure is subsequently emptied and cooled in water. After filtering, coarse grinding and drying, 7524 g of prepolymer are collected.

Example 4: Semicrystalline Diacid Polyamide Prepolymer 11/6.T/10.T

Example 5: Semicrystalline Diamine Polyamide Prepolymer 11/6.T/10.T

The procedure is identical for both examples 4 and 5 except for the material balance described below.
The following are successively introduced into an autoclave reactor with a capacity of 2 liters:

|  | Ex. 4 | Ex. 5 |
| --- | --- | --- |
| 11-Aminoundecanoic acid | 41.2 g | 41.2 g |
| 1,6-Hexanediamine (HMDA) | 71.3 g | 71.3 g |
| 1,10-Decanediamine | 250.3 g | 302.3 g |
| Terephthalic acid | 390.0 g | 340.3 g |
| Rhodorsil RG22 | 0.375 g | 0.375 g |
| NaH$_2$PO$_2$, 60% in water | 3.0 g | 3.0 g |
| Water | 188.7 g | 188.7 g |

After closing the reactor, the atmosphere is purged of its oxygen with nitrogen. The reactor is subsequently heated in order to reach 250° C. inside, the pressure in the reactor reaching 32 bar. The water is gradually removed from the reactor by reduction in pressure while maintaining 32 bar and an internal temperature of approximately 250° C. The pressure is subsequently lowered down to atmospheric pressure by reduction in pressure while gradually increasing the internal temperature to 300° C. The reactor having arrived at atmospheric pressure is subsequently flushed with nitrogen for 20 minutes. The contents of the reactor are subsequently emptied and cooled in water. After filtering, coarse grinding and drying, 650 g (ex. 4) and 665 g (ex. 5) of prepolymers are collected.

The essential characteristics of the prepolymers synthesized are presented in table 1 below.

TABLE 1

Characteristics of the prepolymers $P(X)_n$ prepared

| Prepolymer Ex. structure | X | Tg (° C.) | Tm. (° C.) | Tc (° C.)) | NH$_2$ (meq/g) | COOH (meq/g) | n calc | Mn calc | Intrinsic viscosity (dl/g) | Melt viscosity, 100 s$^{-1}$ (Pa·s) | T° Melt viscosity temperature (° C.) |
|---|---|---|---|---|---|---|---|---|---|---|---|
| 1 10.I/6.I | Carboxyl | 88 | — | — | 0 | 1.931 | 2 | 1035 | ND | 0.35 | 250 |
| 2 10.I/6.I | Amine | 60 | — | — | 1.838 | 0 | 2 | 1088 | ND | 0.15 | 250 |
| 3 11/B.I/B.T * | Carboxyl | 122 | — | — | 0 | 1.873 | 2 | 1067 | 0.19 | 2.6 | 250 |
| 4 11/6.T/10.T | Carboxyl | 101 | 267 | 235 | 0 | 0.845 | 2 | 2366 | 0.35 | 1.1 | 300 |
| 5 11/6.T/10.T | Amine | 89 | 274 | 244 | 0.710 | 0 | 2 | 2817 | 0.43 | 1.7 | 300 |

* B: BMACM

B) Preparation of the Composite Parts and Performance
1) Apparatus Used and Operating Principle:

The RTM equipment used comprises 2 separate heating chambers which make it possible to separately melt the prepolymer and the chain extender. Two pistons (one per chamber), operating under 1 to 10 bar, make it possible to convey the 2 molten components into a static mixer and then to inject the reactive mixture into a mold comprising a fibrous reinforcement.

The residence time is short (less than 10 s) and makes it possible to prevent any significant chain elongation. Thus, the viscosity of the mixture can be regarded as identical to that of the prepolymer alone, by the injection temperature.

The fibrous reinforcement used is a 600T FV fabric from Chomrat (600 g/m$^2$). Four layers of this fibrous reinforcement were deposited in the mold before injection in order to manufacture a composite sheet. The content of fibers in the composite sheet is 60 vol %.

The speed of the piston also makes it possible to adjust the residence time in the mixer so as to compare the effect of certain parameters of the process according to the invention and outside the invention.

The molar ratio of reactive functional groups X to reactive functional groups Y is 1/1 (stoichiometry).

Shape and size of the mold and type of mold (mold material): the mold is cylindrical with a diameter of 70 mm and with a height of 4 mm.

% by volume or by weight of fibers: % by volume of fibers is 60%.

Mechanical performance measured in 3-point bending according to the ISO 14125 method.

Melting point of the prepolymers and extenders: less than 280° C., often less than 270° C. (cf. table I).

EXAMPLES

Example 6 (Comparative): Use of a PA 11 Polymer, Originating from Arkema Under the Trade Name Tnat 2P, (Mn=15 000 g/mol)

A PA 11, of viscosity 200 Pa·s, is injected at a temperature of 250° C., the mold being preheated to 250° C. before the filling. Only one of the 2 chambers of the equipment is used (as the system is single-component and nonreactive).

Results: no correct impregnation of the fibers, the resin covers bundles of fibers and regions of dry fibers remain after injection molding.

Example 7 (Comparative): Use of a Prepolymer of 11/B.I/B.T Type (Resin of Example 3 of Table 1)

Said prepolymer is melted in one of the chambers before chain elongation. This prepolymer is diacid functionalized. In the other chamber, PBO (bisoxazoline), Allinco 1-3 sold by DSM, which is a chain extender exhibiting 2 oxazoline functional groups, is melted.

The introduction of the prepolymer+chain extender mixture is deliberately delayed for a few minutes, so that the viscosity of the mixture then reaches 150 Pa·s, and then the mixture is introduced into the mold, preheated to a temperature of 250° C., comprising the reinforcing fibers.

Temperature for measurement of the viscosity of 150 Pa·s: at 250° C.

Results: the impregnation is better than in the preceding case (example 6); it is possible to measure mechanical properties but the latter remain weak. Nevertheless, a chain elongation is observed which reflects the increase in the Tg (see table 2).

TABLE 2

Mechanical properties and Tg measurement on composite with prepolymer of 11/B.I/B.T type

| 3-POINT BENDING | | | DSC | |
|---|---|---|---|---|
| E (GPa), Youngs modulus | σ Breaking stress (MPa) | ε Strain at break (%) | Tg prepolymer | Tg composite sheet |
| 19.5 | 124 | 0.71 | 122° C. | 144° C. |

Example 8 (According to the Invention): Use of a Prepolymer of 10.1/6.1 Type (Resin of Example 1 of Table 1)

Said prepolymer is melted in one of the chambers before chain elongation. This prepolymer is diacid functionalized. In the other chamber, PBO (bisoxazoline), Allinco 1-3 sold by DSM, which is a chain extender exhibiting 2 oxazoline functional groups, is melted.

The reactive mixture is subsequently injected at 250° C. in less than 10 s into a mold preheated to 250° C. The melt viscosity of the mixture is that of the prepolymer, i.e. 0.4 Pa·s.

Results: the impregnation is successful. The mechanical properties and the Tg are given in table 3.

TABLE 3

Mechanical properties and Tg measurement on composite with prepolymer of 10.I/6.I type

| 3-POINT BENDING | | | DSC | |
|---|---|---|---|---|
| E (GPa), Youngs modulus | σ Breaking stress (MPa) | ε Strain at break (%) | Tg prepolymer | Tg composite sheet |
| 27.5 | 612 | 2.70 | 88° C. | 118° C. |

Example 8 (Invention): Use of a Prepolymer of 11/10.T/6.T Type (Resin of Example 4 of Table 1)

Said prepolymer is melted in one of the chambers before chain elongation. This prepolymer is diacid functionalized. In the other chamber, PBO (bisoxazoline), Allinco 1-3 sold by DSM, which is a chain extender exhibiting 2 oxazoline functional groups, is melted.

The reactive mixture is subsequently injected at 280° C. in less than 10 s into a mold preheated to 280° C. The melt viscosity of the mixture is that of the prepolymer, i.e. 1 Pa·s.

Results: the impregnation is successful. The mechanical properties in the Tg are given in table 4.

TABLE 4

Mechanical properties and Tg measurement on composite with prepolymer of diacid 11/10.T/6.T type

| 3-POINT BENDING | | | DSC | |
|---|---|---|---|---|
| E (GPa) | σ Breaking (MPa) | ε Break (%) | Tg prepolymer | Tg composite sheet |
| 25.8 | 670 | 3.39 | 101° C. | 116° C. |

Example 9 (Invention): Use of a Prepolymer of 11/10.T/6.T Type (Resin, Example 5, Table 1)

Said prepolymer is melted in one of the chambers before chain elongation. This prepolymer is diamine functionalized. In the other chamber, PMDA (pyromellitic dianhydride), sold by Sigma-Aldrich, which is a chain extender exhibiting 2 anhydride functional groups, is melted.

The reactive mixture is subsequently injected at 280° C. in less than 10 s into a mold preheated to 280° C. The melt viscosity of the mixture is that of the prepolymer, i.e. 2 Pa·s.

Results: the impregnation is successful. The mechanical properties and the Tg are given in table 5.

TABLE 5

Mechanical properties and Tg measurement on composite with prepolymer of diamine 11/10.T/6.T type

| 3-POINT BENDING | | | DSC | |
|---|---|---|---|---|
| E (GPa) | σ Breaking (MPa) | ε Break (%) | Tg prepolymer | Tg composite sheet |
| 25.2 | 610 | 2.8 | 89° C. | 110° C. |

The invention claimed is:

1. A process for the manufacture of a composite material, the composite material comprising an assemblage of one or more synthetic reinforcing fibers, which is impregnated with at least one thermoplastic polymer having a glass transition temperature Tg of greater than or equal to 80° C., said process comprising:
   i) a stage of impregnation of said assemblage with a precursor composition in the molten state, the impregnation being carried out at a temperature such that the viscosity of said precursor composition in the molten state does not exceed 100 Pa·s, with said precursor composition comprising:
      a) at least one prepolymer of said thermoplastic polymer, comprising a molecular chain having, at its ends, n identical reactive functional groups X, said prepolymer being of semiaromatic and/or semicycloaliphatic structure, with X being a reactive functional group from: OH, $NH_2$ or COOH, with n ranging from 1 to 3,
      b) at least one chain extender, which can be represented by Y-A-Y, comprising two identical Y functional groups which react with at least one of said X functional groups, wherein A is a carbon-based spacer or radical carrying the two Y groups,
   ii) a stage of bulk polymerization by (poly)addition in the molten state of said prepolymer with said chain extender,
   with said thermoplastic polymer being the result of said bulk polymerization by polyaddition.

2. The process as claimed in claim 1, wherein the process comprises a stage iii) of final processing of said composite material.

3. The process as claimed in claim 1, wherein the polymerization stage ii) is carried out at a temperature ranging from 150 to 340° C.

4. The process as claimed in claim 1, wherein said thermoplastic polymer is chosen from: a polyamide, a polyester, their copolymers, including polyamide-polyether, or their mixtures.

5. The process as claimed in claim 1, wherein said chain extender is nonpolymeric and nonoligomeric.

6. The process as claimed in claim 1, wherein said prepolymer corresponds to:
   n=1 or 2,
   X being a reactive functional group from: OH, $NH_2$, COOH,
   said chain P comprising a cycloaliphatic and/or aromatic structure comprising at least one ring of 4, 5 or 6 carbon atoms which is optionally substituted.

7. The process as claimed in claim 6, wherein the choice of said chain extender with respect to X is as follows:
when X is $NH_2$ or OH:
either the chain extender Y-A-Y corresponds to:
Y chosen from the groups: maleimide, isocyanate which may be blocked, oxazinone and oxazolinone,
and
A is a carbon-based spacer or carbon-based radical carrying the functional groups Y and is chosen from:
a covalent bond between two Y functional groups in the case where Y=oxazinone or oxazolinone, or
an aliphatic hydrocarbon chain or an aromatic and/or cycloaliphatic hydrocarbon chain, the latter two comprising at least one ring of 5 or 6 carbon atoms which is optionally substituted, with optionally said aliphatic hydrocarbon chain having a molecular weight of 14 to 200 $g \cdot mol^{-1}$,
or the chain extender Y-A-Y corresponds to Y being a caprolactam group and to A being a carbonyl radical,
or to A being a terephthaloyl or an isophthaloyl,
or said chain extender corresponds to Y being a cyclic anhydride group and this extender is chosen from a cycloaliphatic and/or aromatic dicarboxylic anhydride,
and
when X is COOH:
said chain extender Y-A-Y corresponds to:
Y chosen from the groups: oxazoline, oxazine, imidazoline or aziridine,
and to
A being a carbon-based spacer or a carbon-based radical as defined above for when X is $NH_2$ or OH.

8. The process as claimed in claim 1, wherein, when Y is chosen from oxazinone, oxazolinone, oxazine, oxazoline or imidazoline, in this case, in the chain extender represented by Y-A-Y, A represents an alkylene, $-(CH_2)_m-$ with m ranging from 1 to 14, or A represents a cycloalkylene and/or an arylene which is alkyl-substituted or unsubstituted.

9. The process as claimed in claim 1, wherein said prepolymer is a polyamide prepolymer obtained from:
the polycondensation of at least one linear or branched aliphatic diamine and of at least one aromatic and/or cycloaliphatic dicarboxylic acid comprising at least one ring having 4, 5 or 6 carbon atoms which is optionally substituted, and/or
the polycondensation of at least one cycloaliphatic diamine with at least one linear or branched aliphatic, cycloaliphatic or aromatic dicarboxylic acid, and optionally with the presence of at least one compound chosen from: a lactam, an aminocarboxylic acid or the stoichiometric combination of an aliphatic dicarboxylic acid and an aliphatic diamine.

10. The process as claimed in claim 1, wherein said thermoplastic polymer is a semiaromatic and/or semicycloaliphatic polyamide, homopolyamide or copolyamide selected from the group consisting of:
polyamides selected from the group consisting of: 8.T, 9.T, 10.T, 11.T, 12.T, 6.T/9.T, 9.T/10.T, 9.T/11.T, 9.T/12.T, 9/6.T, 10.6.T, 11/6.T, 12/6.T, 10/9.T, 10/10.T, 10/11.T, 10/12.T, 11/9.T, 11/10.T, 11/11.T, 11/12.T, 12/9.T, 12/10.T, 12/11.T, 12/12.T, 6.10/6.T, 6.12/6.T, 9.10/6.T, 9.12/6.T, 10.10/6.T, 10.12/6.T, 6.10/9.T, 6.12/9.T, 9.10/9.T, 9.12/9.T, 10.10/9.T 10.12/9.T, 6.10/10.T, 6.12/10.T, 9.10/10.T, 9.12/10.T, 10.10/10.T, 10.12/10.T, 6.10/12.T, 6.12/12.T, 9.10/12.T, 9.12/12.T, 10.10/12.T, 11/6.T/9.T, 11/6.T/10.T, 11/6.T/11.T, 11/6.T/12.T, 11/9.T/10.T, 11/9.T/11.T, 11/9.T/12.T, 11/10.T/11.T, 11/10.T/12.T, 11/11.T/12.T, 6.T/10.T, 6.T/11.T, 6.T/12.T, 10.T/11.T, 10.T/12.T, 11.T/12.T, 12/6.T/10.T, 12/6.T/11.T, 12/6.T/12.T, 12/9.T/10.T, 12/9.T/11.T, 12/9.T/12.T, and 12/10.T/11.T, 12/10.T/12.T, 12/11.T/12.T,
preceding terpolymer polyamides with 12/replaced with 9/, 10/, 6.10/, 6.12/, 10.10/, 10.12/, 9.10/and 9.12/,
all the abovementioned polyamides where terephthalic (T) is partially or completely replaced with isophthalic (I), with naphthalene-2,6-dicarboxylic and/or with 1,3- or 1,4-CHDA (cyclohexanedicarboxylic acid), with it being possible for all or a portion of the aliphatic diamines to be replaced with cycloaliphatic diamines,
all the abovementioned polyamides, with replacement of the $C_6$ to $C_{12}$ aliphatic diamine with a cycloaliphatic diamine from BMACM, BACM and/or IPDA and with replacement of all or part of the aromatic diacid T with a linear or branched $C_6$ to $C_{18}$ aliphatic diacid.

11. The process as claimed in claim 1, wherein said thermoplastic polymer is a semicrystalline polyamide having a melting point temperature Tm and a crystallization temperature Tc with the difference between the melting point temperature Tm of said polyamide and the crystallization temperature Tc being less than 100° C.

12. The process as claimed in claim 1, wherein said thermoplastic polymer is an amorphous polyamide.

13. The process as claimed in claim 1, wherein said synthetic reinforcing fibers are chosen from:
mineral fibers,
polymer fibers, these having a melting point temperature Tm' or a glass transition temperature Tg' greater than the polymerization temperature of said precursor composition,
or the mixtures of the abovementioned fibers.

14. The process as claimed in claim 13, wherein said assemblages are chosen from fabrics, nonwovens or unidirectional fibrous reinforcements, laps or strips or plaits, or cut fibers.

15. The process as claimed in claim 1, wherein the impregnation stage i) is carried out under a pressure ranging from 1 to 30 bar.

16. The process as claimed in claim 1, wherein said polymerization of stage ii) is optionally completed, after the processing stage iii), by a separate final stage comprising an annealing of said final composite material.

17. The process as claimed in claim 2, wherein the impregnation stage i) is carried out in a mold for the final processing of said composite.

18. The process as claimed in claim 17, wherein said impregnation stage i) comprises a direct transfer of said precursor composition in the molten state onto said assemblage of fibers.

19. The process as claimed in claim 17, wherein said assemblage of fibers is a preform of said fibers positioned beforehand in said mold.

20. The process as claimed in claim 18, wherein said direct transfer is carried out in the molten state by extrusion of said prepolymer with addition of said extender in the extrusion screw or with addition of said extender downstream of the extruder by means of a mixer.

21. The process as claimed in claim 17, wherein the impregnation stage i) is separated in time from the polymerization stage ii) and from the final processing stage iii).

22. The process as claimed in claim 21, wherein the polymerization stage and the processing stage are simultaneous.

23. The process as claimed in claim 2, wherein said stage i) of impregnation in the molten state comprises a preliminary stage of dusting said assemblage of fibers with said precursor composition in the powder state, followed by a stage of heating and melting said powder and optionally by a calendaring stage, thus obtaining a preimpregnated fibrous material as intermediate product, before the polymerization stage ii) and the final processing stage iii).

24. The process as claimed in claim 2, wherein said stage of impregnation in the molten state comprises a stage of coating, in a fluidized bed, said assemblage of fibers with a powder of said precursor composition, followed by the heating and melting of said powder, thus obtaining a preimpregnated fibrous material as intermediate product, before the polymerization stage ii) and the final processing stage iii).

25. The process as claimed in claim 23, wherein the impregnation stage i) is carried out outside the mold for the final processing of said composite.

26. The process as claimed in claim 17, wherein said processing stage iii) is carried out in a closed mold with resin transfer molding (RTM), structural reaction injection molding (S-RIM) or infusion molding or injection/compression molding.

27. The process as claimed in claim 17, wherein said processing stage iii) is carried out in an open mold by pultrusion through a heating die, with optional additional conversion of the semi-finished products obtained, by superimposition of UD bands obtained, by the AFP (Automatic Fiber Placement) technique or by thermocompression, with AFP comprising laser heating, with said starting precursor composition comprising specific additives which absorb at the wavelength of UV or IR laser.

28. The process as claimed in claim 23, wherein the processing stage iii) is carried out by thermocompression or by lamination of at least one preimpregnated fibrous material resulting from said impregnation stage i), optionally completed by a final shaping by thermoforming or stamping.

29. The process as claimed in claim 28, wherein said processing stage iii) comprises the positioning of at least two preimpregnated fibrous materials resulting from said impregnation stage i) on a mold preform, in staggered fashion, so that they are at least partially superimposed, until the desired thickness is obtained.

30. A reactive precursor composition for the implementation of the process as defined according to claim 1, wherein the reactive precursor composition comprises a) at least one prepolymer $P(X)_n$ of said thermoplastic polymer, comprising a molecular chain P having, at its ends, n identical reactive functional groups X, said prepolymer being of semiaromatic and/or semicycloaliphatic structure, with X being a reactive functional group from: OH, $NH_2$ or COOH, with n ranging from 1 to 3, and b) at least one chain extender which can be represented by Y-A-Y, comprising two identical Y functional groups which react with at least one of said X functional groups, with said thermoplastic polymer resulting from said precursor composition by bulk polyaddition reaction and said polymer having a glass transition temperature of greater than or equal to 80° C.

31. The precursor composition as claimed in claim 30, wherein the precursor composition comprises specific additives which absorb at the wavelength of a UV or IR laser, acting as heating means, thus making the prepregs weldable during the automatic fiber placement operation.

32. A composition of composite material or for composite material, wherein the composition comprises, in addition to said precursor composition as defined according to claim 30, an assemblage of one or more synthetic reinforcing.

33. A preimpregnated fibrous material, wherein the preimpregnated fibrous material results from the impregnation in the molten state of an assemblage of one or more synthetic reinforcing fibers with at least one precursor composition as defined according to claim 30.

34. A composite material, wherein the composite material is obtained according to the manufacturing process as defined according to claim 1 by using at least one precursor composition, wherein the reactive precursor composition comprises a) at least one prepolymer $P(X)_n$ of said thermoplastic polymer, comprising a molecular chain P having, at its ends, n identical reactive functional groups X, said prepolymer being of semiaromatic and/or semicycloaliphatic structure, with X being a reactive functional group from: OH, $NH_2$ or COOH, with n ranging from 1 to 3, and b) at least one chain extender which can be represented by Y-A-Y, comprising two identical Y functional groups which react with at least one of said X functional groups, with said thermoplastic polymer resulting from said precursor composition by bulk polyaddition reaction and said polymer having a glass transition temperature of greater than or equal to 80° C., for the impregnation stage i) and for the polymerization stage ii).

35. The composite material as claimed in claim 34, wherein the composite material is a composite mechanical or structural part, in the field of aeronautics, the motor vehicle industry, the railroad industry, road transportation, wind power, photovoltaics, sports and leisure, including water sports, the construction industry or civil engineering.

* * * * *